(12) United States Patent
Mizoguchi

(10) Patent No.: US 8,848,258 B2
(45) Date of Patent: Sep. 30, 2014

(54) OUTPUT SYSTEM, CREATING APPARATUS, DISPLAY APPARATUS, OUTPUT METHOD, AND RECORDING MEDIUM FOR CREATING OUTPUT DATA, DISPLAYING A PREVIEW IMAGE CORRESPONDING TO THE OUTPUT DATA, AND OUTPUTTING THE OUTPUT DATA

(75) Inventor: Yoshihiro Mizoguchi, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 508 days.

(21) Appl. No.: 13/192,560

(22) Filed: Jul. 28, 2011

(65) Prior Publication Data

US 2012/0026555 A1 Feb. 2, 2012

(30) Foreign Application Priority Data

Jul. 30, 2010 (JP) ................................. 2010-172421

(51) Int. Cl.
*H04N 1/40* (2006.01)
*G06F 3/12* (2006.01)
(52) U.S. Cl.
CPC ............ *G06F 3/1208* (2013.01); *G06F 3/1285* (2013.01); *G06F 3/1256* (2013.01)
USPC ............ 358/3.28; 358/1.9; 358/1.15; 726/17; 726/18; 726/21; 726/26; 726/30
(58) Field of Classification Search
CPC ............ H04N 1/00161; H04N 1/0044; H04N 1/00456; H04N 1/00159; H04N 1/4406; H04N 2201/3246
USPC .................................................. 358/1.1–3.29
See application file for complete search history.

(56) References Cited

U.S. PATENT DOCUMENTS

| | | |
|---|---|---|
| 6,288,789 B1 | 9/2001 | Harada |
| 2003/0103221 A1 | 6/2003 | Natori |
| 2007/0002050 A1 | 1/2007 | Aoki et al. |
| 2007/0211296 A1* | 9/2007 | Toda ............................. 358/1.18 |
| 2009/0237326 A1* | 9/2009 | Takahashi et al. ............. 345/2.1 |

FOREIGN PATENT DOCUMENTS

| | | |
|---|---|---|
| CN | 1885255 A | 12/2006 |
| CN | 101038533 A | 9/2007 |
| JP | 07040608 A | 2/1995 |
| JP | 2002366542 A | 12/2002 |
| JP | 2003167721 A | 6/2003 |
| JP | 2004-185325 A | 7/2004 |
| JP | 2007-233942 A | 9/2007 |
| JP | 2008-012715 A | 1/2008 |
| JP | 2008-020974 A | 1/2008 |
| JP | 2009-064306 A | 3/2009 |
| JP | 2009-301189 A | 12/2009 |
| JP | 2010-109823 A | 5/2010 |

* cited by examiner

*Primary Examiner* — Benny Q Tieu
*Assistant Examiner* — Marcellus Augustin
(74) *Attorney, Agent, or Firm* — Edwards Wildman Palmer LLP; David G. Conlin; David J. Silvia

(57) ABSTRACT

When output data is created, image data for preview image is generated based on the output data. Based on the image data, a preview image corresponding to the output data is displayed.

10 Claims, 16 Drawing Sheets

FIG. 5

JUDGMENT CONDITION SETTING:

☐ A PRINT IS IMPOSSIBLE UNLESS O.K. FROM
   ALL THE CONSIDERING PERSONS ARE NOT RECEIVED

☐ A PRINT IS POSSIBLE EVEN WHEN O.K. FROM
   ANY CONSIDERING PERSON IS RECEIVED

☐ A PRINT IS IMPOSSIBLE UNLESS O.K. FROM
   A MAJORITY OF CONSIDERING PERSONS
   ARE NOT RECEIVED

☐ A PRINT IS POSSIBLE ONLY IF O.K. FROM
   THE SPECIFIC CONSIDERING PERSON IS RECEIVED

CONFIRMATION REQUEST END:

☐ MR./MRS. A
☐ MR./MRS. B
☐ MR./MRS. C

[ OK ]   [ CANCEL ]

FIG. 10

| CONFIRMATION REQUEST END | RESULT | COMMENT |
|---|---|---|
| MR./MRS. A | OK | |
| MR./MRS. B | NG | PLEASE MODIFY "A, I, U, E, O". |
| MR./MRS. C | (UNANSWERED) | |

OK

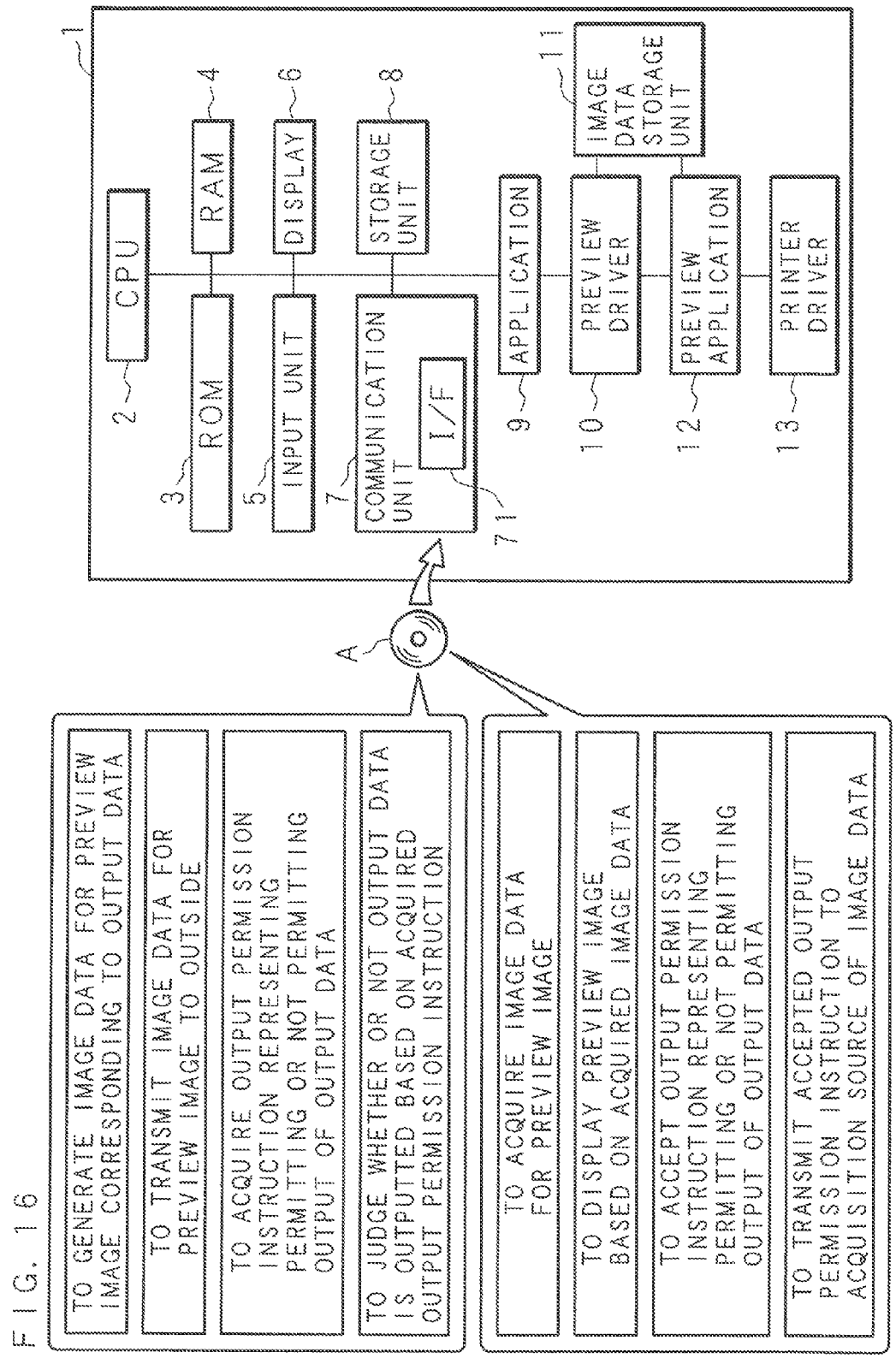

OUTPUT SYSTEM, CREATING APPARATUS, DISPLAY APPARATUS, OUTPUT METHOD, AND RECORDING MEDIUM FOR CREATING OUTPUT DATA, DISPLAYING A PREVIEW IMAGE CORRESPONDING TO THE OUTPUT DATA, AND OUTPUTTING THE OUTPUT DATA

CROSS-REFERENCE TO RELATED APPLICATIONS

This Nonprovisional application claims priority under 35 U.S.C. §119(a) on Patent Application No. 2010-172421 filed in Japan on Jul. 30, 2010, the entire contents of which are hereby incorporated by reference.

BACKGROUND

1. Technical Field

The present invention relates to an output system, a creating apparatus, a display apparatus, an output method, and a recording medium in which a computer program is recorded, for creating output data, displaying a preview image corresponding to the output data on an external device, and outputting the output data according to an instruction from the external device.

2. Description of Related Art

For example, in order to output document data, such as text and image (hereinafter referred to as output data) created by a user on an application activated in a personal computer through an image forming apparatus, such as a printer and a multi-function peripheral, a printer driver is installed in the personal computer.

Moreover, the so-called preview function is in widespread use, and in the preview function, the form of an output result to be outputted from a printer is displayed on a display section of a personal computer by using such a printer driver so that a user is able to confirm the output result in advance on the screen of the display section.

On the other hand, Japanese Patent Application Laid-Open No. 2002-366542 discloses an editing apparatus and a printing apparatus in which, when a plurality of persons share the burden of one document and create it, a preview image data of the document in which a plurality of document data are collected, is transmits to an administrator before printing, and when a modification demand notification is received from the administrator, based on a document ID contained in the modification demand notification, the modification demand notification is transmitted to a destination of a corresponding document creating person.

SUMMARY

However, in the editing apparatus and the printing apparatus disclosed in Japanese Patent Application Laid-Open No. 2002-366542, since the preview image data of the document is transmitted to a considering person (administrator), for example, when a preview image is displayed using a printer driver as usual, according to terminals, different image of the document may displayed. That is, a problem may also occurs such that when an image of the document is displayed at the terminal of the considering person, the different image from the image displayed at the terminal on the creating person side is not always displayed, and a consideration is performed based on the document of the display status different from that of the document actually printed. Moreover, such a problem becomes serious in a case of a plurality of the considering persons. The respective considering person considers based on the document of the different display status.

The present invention has been made with the aim of solving the above problems, and it is an object of the invention to provide an output system, a creating apparatus, a display apparatus, an output method and a recording medium in which a computer program is recorded, which generate image data for preview image based on the created output data and display a preview image based on the image data to display a real preview image further approximate to the post-output status and to provide more reliable consideration since when a document concerning the output data is considered, the same document image is displayed even at a terminal of other type, and even if a plurality of considering persons exist, they consider based on the same image of the document.

Another object of the present invention is to provide an output system, a creating apparatus; a display apparatus, an output method and a recording medium in which a computer program is recorded, which display a preview image based on image data for preview image on a display section, accept settings of an output condition and a post-output processing condition, modify image data for preview image based on the output condition and the post-output processing condition, and display a preview image based on the image data to promptly reflect a change of the output condition and the post-output processing condition on a preview image, for example, without renewing or regenerating output data each time the output condition and the post-output processing condition are changed.

The output system according to the present invention is an output system comprising a creating apparatus for creating output data, and a display apparatus which is connected to the creating apparatus and displays a preview image corresponding to the created output data, wherein said creating apparatus comprises: a generating section for generating image data for preview image based on the created output data; and a transmitting section for transmitting the image data to the display apparatus, and said display apparatus comprises: an image display section for displaying a preview image based on the received image data; an instruction accepting section for accepting an output permission instruction representing permitting or not permitting output of output data concerning the displayed preview image; and an instruction transmitting section for transmitting the output permission instruction accepted by the instruction accepting section to said creating apparatus, and said creating apparatus outputs said output data based on the received output permission instruction.

In the present invention, the generating section of the creating apparatus generates image data for preview image based on the created output data, and the transmitting section of the creating apparatus transmits the created image data to the display apparatus. On the other hand, the image display section of the display apparatus displays a preview image based on the image data received from the creating apparatus, the instruction accepting section of the display apparatus accepts an output permission instruction of output data concerning the displayed preview image, and the instruction transmitting section of the display apparatus transmits the output permission instruction accepted by the instruction accepting section to the creating apparatus. The creating apparatus outputs the output data based on the output permission instruction received from the display apparatus.

The output system according to the present invention is characterized in that said creating apparatus further comprises: a setting accepting section for accepting settings for an output condition and a post-output processing condition of the output data; and a modifying section for modifying the image data for preview image based on the output condition and the post-output processing condition accepted by the setting accepting section, and wherein said transmitting section transmits the modified image data to said display apparatus, and in said display apparatus, said image display section displays a preview image based on the received and modified image data.

In the present invention, the setting accepting section of the creating apparatus accepts settings for the output condition and the post-output processing condition of the output data, the modifying section of the creating apparatus modifies the image data for preview image based on the output condition and the post-output processing condition accepted by the setting accepting section, and the transmitting section of the creating apparatus transmits the modified image data to the display apparatus. The image display section of the display apparatus displays a preview image based on the modified image data.

The output system according to the present invention is characterized in that a plurality of said display apparatuses are provided, and said creating apparatus outputs the output data when an output permission instruction of permitting output is received from all of the display apparatuses.

In the present invention, the creating apparatus outputs the output data when all the output permission instructions received from the plurality of display apparatuses represent permitting output.

The output system according to the present invention is characterized in that a plurality of said display apparatuses are provided, and said creating apparatus outputs the output data when an output permission instruction of permitting output is received from at least one display apparatus.

In the present invention, the creating apparatus outputs the output data when the output permission instruction of permitting output is received from at least one display apparatus in the output permission instructions received from the plurality of display apparatuses.

The output system according the present invention is characterized in that a plurality of said display apparatuses are provided, and said creating apparatus further comprises: a counting section for counting the number of the received output permission instructions and the number of the received output permission instructions of permitting output in all the received output permission instructions; and a judgment section for judging whether or not the number of the received output permission instructions of permitting output is over than or equal to half of all the received output permission instructions, and wherein when the judgment section judges that the number of the received output permission instructions of permitting output is over than or equal to half of all the received output permission instructions, the output data is outputted.

In the present invention, the counting section of the creating apparatus counts the number of the output permission instructions received from the plurality of display apparatuses and the number of the received output permission instructions of permitting output in all the received output permission instructions, and the judgment section of the creating apparatus judges whether or not the number of the received output permission instructions of permitting output is over than or equal to half of all the received output permission instructions based on a result of counting of the counting section. When the judgment section judges that the number of the received output permission instructions of permitting output is over than or equal to half of all the received output permission instructions, the output data is outputted.

The output system according to the present invention is characterized in that a plurality of said display apparatuses are provided, and said creating apparatus further comprises a specification accepting section for accepting specification of one of the display apparatuses, and wherein when the output permission instruction of permitting output is received from the specified display apparatus, the output data is outputted.

In the present invention, the specification accepting section of the creating apparatus accepts specification of one display apparatus in the plurality of display apparatuses, when the output permission instruction of permitting output is received from the specified display apparatus, the output data is outputted.

The output system according to the present invention is characterized in that said display apparatus further comprises an accepting section for accepting text data, and wherein the instruction transmitting section transmits the accepted text data to said creating apparatus, and said creating apparatus further comprises a display section for displaying text based on the received text data.

In the present invention, the accepting section of the display apparatus accepts text data, and the instruction transmitting section of the display apparatus transmits the accepted text data to the creating apparatus. The creating apparatus receives the text data and displays text based on the text data on the display section.

A creating apparatus according to the present invention is a creating apparatus for creating output data and generating image data for preview image corresponding to the output data based on the created output data, comprising: a transmitting section for transmitting the image data to external; an instruction acquiring section for acquiring an output permission instruction representing permitting or not permitting output of output data concerning the transmitted image data; and an output judgment section for judging whether or not the output data is outputted based on the acquired output permission instruction.

In the present invention, image data for preview image is generated based on the created output data, and the transmitting section transmits the generated image data to, for example an external display apparatus. Then, the instruction acquiring section acquires the output permission instruction from a destination (for example, said external display apparatus) of the image data, and the output judgment section judges whether or not the output data is outputted based on the acquired output permission instruction.

The creating apparatus according to the present invention is characterized by further comprising: a setting accepting section for accepting settings of an output condition and a post-output processing condition of the output data; and a modifying section for modifying the image data for preview image based on the output condition and the post-output processing condition accepted by the setting accepting section, wherein said transmitting section transmits the modified image data.

In the present invention, the setting accepting section accepts the settings of the output condition and the post-output processing condition of the output data, the modifying section modifies the image data for preview image based on the output condition and the post-output processing condition accepted by the setting accepting section, and the transmitting section transmits the modified image data to, for example said external display apparatus.

The creating apparatus according to the present invention is characterized in that said instruction acquiring section acquires a plurality of output permission instructions, and when all of the acquired output permission instructions represent permitting output, the output judgment section judges to output the output data.

In the present invention, when all the plurality of output permission instructions acquired by the instruction acquiring section represent permitting output, the output judgment section judges that the output data is outputted.

The creating apparatus according to the present invention is characterized in that said instruction acquiring section acquires a plurality of output permission instructions, and when at least one of the output permission instructions of permitting output is acquired, the output judgment section judges to output the output data.

In the present invention, when at least one output permission instruction of permitting output in the plurality of output permission instructions is acquired by the instruction acquiring section, the output judgment section judges that the output data is outputted.

The creating apparatus according to the present invention is characterized in that said instruction acquiring section acquires a plurality of output permission instructions, and the creating apparatus further comprises: a counting section for counting the number of the acquired output permission instructions, and the number of the acquired output permission instructions of permitting output in all the acquired output permission instructions; and a judgment section for judging whether or not the number of the acquired output permission instructions of permitting output is over than or equal to half of all the acquired output permission instructions, and wherein when the judgment section judges that the number of the acquired output permission instructions of permitting output is over than or equal to half of all the acquired output permission instructions, the output judgment section judges to output the output data.

In the present invention, the counting section counts the number of the output permission instructions acquired by the instruction acquiring section and the number of the acquired output permission instructions of permitting output in all the acquired output permission instructions, and the judgment section judges whether or not the number of the acquired output permission instructions of permitting output is over than or equal to half of all the acquired output permission instructions based on a result of counting of the counting section. When the judgment section judges that the number of the acquired output permission instructions of permitting output is over than or equal to half of all the acquired output permission instructions, the output judgment section judges that the output data is outputted.

The creating apparatus according to the present invention is characterized by further comprising a specification accepting section for accepting specification of a destination to which the image data is transferred by the transmitting section, and wherein said instruction acquiring section acquires a plurality of output permission instructions, and when the output permission instruction of permitting output is acquired from the specified destination, the output judgment section judges to output the output data.

In the present invention, the specification accepting section accepts specification of one destination. When the instruction acquiring section acquires the output permission instruction of permitting output from said specified destination, the output judgment section judges that the output data is outputted.

The creating apparatus according to the present invention is characterized in that the instruction, acquiring section acquires text data with the output permission instruction, and the creating apparatus further comprises a display section for displaying text based on the acquired text data.

In the present invention, the instruction acquiring section acquires text data from, for example the external display apparatus, and text based on the acquired text data is displayed on the display section.

The creating apparatus according to the present invention is characterized by further comprising an adding section for adding watermark data to the output data when the output judgment section judges that the output data is not outputted while the output data is outputted.

In the present invention, when the output judgment section judges that the output data is not outputted, for example, but a user forcibly instructs image formation of the output data on a record sheet, the adding section adds watermark data to the output data and image formation is performed based on the output data in which the watermark data is added.

The creating apparatus according to the present invention is characterized by further comprising: a condition display section for displaying a plurality of judgment conditions whether or not the output data is outputted on the display section; and a condition selection accepting section for accepting selection of any judgment condition from the plurality of judgment conditions, and wherein the output judgment section judges whether or not the output data is outputted based on the judgment condition concerning the selection and the acquired output permission instruction.

In the present invention, the condition display section displays a plurality of the judgment conditions on the display section. When a user selects any judgment condition from the displayed judgment conditions, the condition selection accepting section accepts selection of any judgment condition. The output judgment section judges whether or not the output data is outputted based on the selected judgment condition and the acquired output permission instruction.

The display apparatus according to the present invention is a display apparatus for displaying a preview image corresponding to output data, comprising: an acquiring section for acquiring image data for preview image; an image display section for displaying a preview image based on the acquired image data; an instruction accepting section for accepting an output permission instruction representing permitting or not permitting output of output data concerning the displayed preview image; and an instruction transmitting section for transmitting the accepted output permission instruction to an acquisition source of said image data.

In the present invention, the acquiring section acquires image data for preview image corresponding to the output data, and the image display section displays a preview image based on the image data acquired by the acquiring section. The instruction accepting section accepts the output permission instruction from a user, for example, and the instruction transmitting section transmits the output permission instruction accepted by the instruction accepting section to the acquisition source of the image data.

The output method according to the present invention is an output method for creating and outputting output data, comprising: a step for generating image data for preview image corresponding to output data based on the created output data; a step for transmitting the generated image data for preview image to external; a step for acquiring an output permission instruction representing permitting or not permitting output of output data concerning the transmitted image data; and a step for determining whether or not the output data is outputted based on the acquired output permission instruction.

The recording medium according to the present invention is a non-transitory computer-readable recording medium in which a computer program for creating and outputting output data is recorded, said computer program comprising: a step for causing the computer to generate image data for preview image corresponding to output data based on the created output data; a step for causing the computer to transmit the generated image data for preview image to external; a step for causing the computer to acquire an output permission instruction representing permitting or not permitting output of output data concerning the transmitted image data; and a step for causing the computer to determine whether or not the output data is outputted based on the acquired output permission instruction.

In the present invention, based on the created output data, the image data for preview image corresponding to the output data is generated, and the generated image data for preview image is transmitted to an external display apparatus, for example. Then, the output permission instruction is acquired from the destination for transmission (for example, the external display apparatus) of the image data, and it is determined whether or not the output data is outputted based on the acquired output permission instruction.

In the present invention, the above-described computer program is recorded on the recording medium. A computer reads the computer program from the recording medium, and the above-described output system, creating apparatus, display apparatus, and output method are realized by the computer.

According to the present invention, image data for preview image is generated based on the created output data and a preview image is displayed based on the image data, thereby displaying a real preview image further approximate to the post-outputting condition. In addition, when a document concerning the output data is considered, the same document image is displayed even at a terminal of other type, and even if a plurality of considering persons exist, they consider based on the same image of the document, thereby providing more reliable consideration.

According to the present invention, the preview image based on the image data for preview image is displayed on the display section, the settings for the output condition and the post-output processing condition are accepted, the image data for preview image is modified based on the output condition and the post-output processing condition, and a preview image is displayed based on the image data, thereby promptly reflecting change of the output condition and the post-output processing condition on a preview image, for example, without renewing or regenerating output data each time the output condition and the post-output processing condition are changed.

The above and further objects and features will more fully be apparent from the following detailed description with accompanying drawings.

BRIEF DESCRIPTION OF THE SEVERAL VIEWS OF THE DRAWINGS

FIG. 5 is an exemplary view, showing an example of a judgment condition setting screen in Embodiment 1 of the present invention.

FIG. 10 is an exemplary view showing an example of a detailed check-up screen of a received output permission instruction in the output system according to Embodiment 1 of the present invention.

FIG. 16 is a functional block diagram showing essential configurations of a PC of Embodiment 5 of the present invention.

DETAILED DESCRIPTION

The following description will explain an example in which a creating apparatus and an image display apparatus according to an embodiment of the present invention are personal computers and an output system according to an embodiment of the present invention are constituted of a plurality of personal computers and one multi-function peripheral.

Embodiment 1

Figure 1:
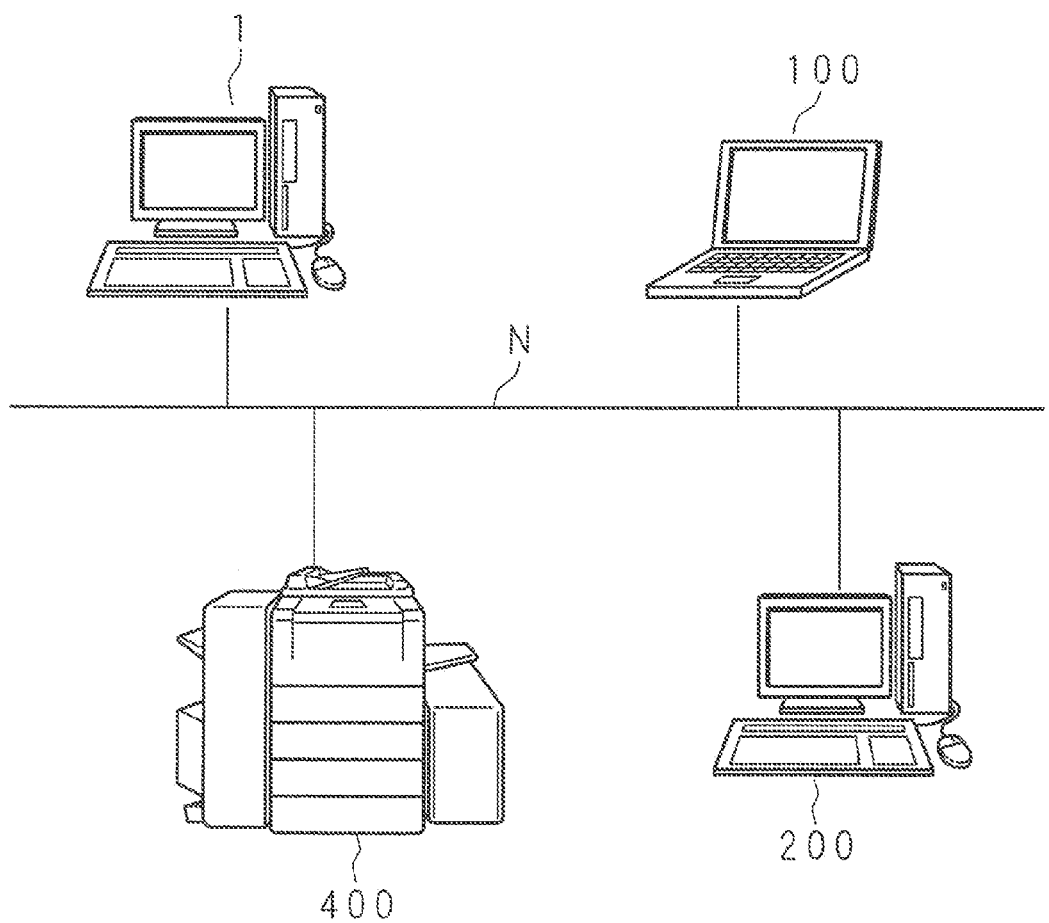
FIG. 1 is a schematic diagram showing a configuration of an output system according to Embodiment 1 of the present invention.

FIG. 1 is a schematic diagram showing a configuration of an output system according to Embodiment 1 of the present invention. Said personal computers (hereinafter referred to as PC) which are a PC 1, a PC 100, a PC 200, and a multi-function peripheral 400 are connected to each other via a network N.

The PC 1 corresponds to the creating apparatus according to Embodiment 1 of the present invention, and the PC 100 and the PC 200 corresponds to the display apparatus according to Embodiment 1 of the present invention. The output system according to Embodiment 1 of the present invention is constructed such that when a user (hereinafter referred to as creating person) of the PC 1 prints (outputs) document data (output data) created by himself/herself, print is performed with the multi-function peripheral 400 in the case where permission of print (output) is obtained from users (hereinafter referred to as considering persons) of the PC 100 and the PC 200.

Figure 2:
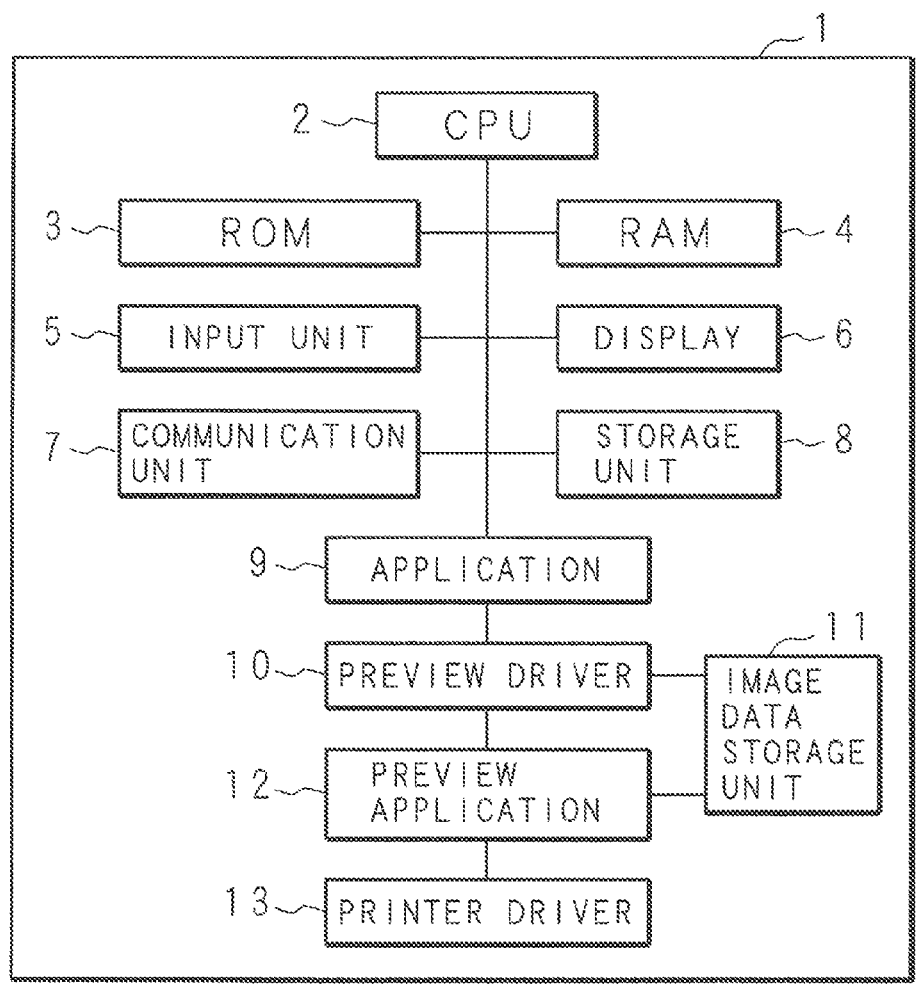
FIG. 2 is a functional block diagram for explaining essential configurations of a creating person's personal computer (PC) in the output system according to Embodiment 1 of the present invention.

FIG. 2 is a functional block diagram for explaining essential configurations of the creating person's PC 1 in the output system according to Embodiment 1 of the present invention.

The PC 1 uses, for example, the Microsoft Windows operating system (OS) available from Microsoft Corporation. The PC 1 comprises a CPU 2, a ROM 3, a RAM 4, an application 9, a storage unit 8, a preview driver 10, a preview application 12, a printer driver 13, an input unit 5, a display 6, a communication unit 7, and an image data storage unit 11.

The ROM 3 stores various kinds of control programs, and data for a later-described judgment condition setting screen, watermark data, a comment display, etc. in advance, and the RAM 4 is capable of storing data temporarily and allows the data to be read regardless of the order, position etc. they are stored. The RAM 4 stores, for example, a program read from the ROM 3, various kinds of data generated by the execution of the program, and various kinds of data received from external devices.

The CPU 2 controls the above-described various hardware devices by loading on the RAM 4 the control program stored in the ROM 3 in advance and executing it, and operates the whole apparatus as the PC 1 of the creating person in Embodiment 1 of the present invention.

The application 9 is an application program for providing text editing functions, such as word processing, paint, and presentation functions. Document data created on the application 9 is supplied to the preview driver 10 via an interface of the OS.

The input unit 5 comprises, for example, a keyboard, a mouse, etc. When document data is created on the application 9, data is inputted via the input unit 5.

The display 6 is a liquid crystal display, for example, displays a preview image based on image data for preview image generated on the preview driver 10, displays said judgment condition setting screen by the later-described preview application 12, and displays a comment etc. received from the PC 100 or the PC 200.

The communication unit 7 includes a network card, modem, etc. for sending, for example, document data to the multi-function peripheral 400, sending a request of later-described confirmation permitting or not permitting output etc. to the PC 100 or the PC 200, and receiving a result of the confirmation permitting or not permitting output (output permission instruction), etc. from the PC 100 or the PC 200.

When the creation of document data on the application 9 is completed and an instruction for print (output) is received from a creating person, the preview driver 10 (generating section) is activated and generates image data for preview image corresponding to the document data.

In detail, the preview driver 10 generates image data only for preview image (intermediate file) based on the document data received from the application 9 and information received from the printer driver 13. For example, in the case where said document data has a plurality of pages, the image data is EMF (Enhanced Meta File) data for each page of the document data, and contains the document data and meta data (paper size, resolution and orientation, etc.) for printing the document data. Since the image data is the EMF data, it has excellent spread possibility, reproducibility, etc. That is, as described later, when a preview image is displayed based on the image data acquired by a plurality of the considering persons and the permitting or not permitting output of the document is confirmed, the respective considering persons can consider the permitting or not permitting output of the document using the same preview image, regardless of an apparatus for displaying a preview image. Moreover, the image data only for preview image (intermediate file) is not limited to the EMF data, but may be XPS data.

As described above, the image data generated by the preview driver 10 is stored in the image data storage unit 11.

The preview application 12 displays a preview image on the display 6 to assist the document creating person to check contents and printed (outputted) status of the document, displays a setting accepting screen that is an interface for accepting from the creating person settings of print (output) conditions (for example, the number of copies, duplex/single-side printing, multiple pages per sheet printing, scaled printing, etc.) for print based on document data and post-print (output) processing conditions (such as binding and stapling, etc.), and accepts the settings. Based on the accepted settings, the preview application 12 modifies the image data for preview image, and displays a preview image based on the modified image data on the display 6. Further, the preview application 12 sends the document data, the print conditions and the post-print processing conditions to the printer driver 13, and gives an instruction to send them to the multi-function peripheral 400.

The preview application 12 sends the image data (EMF data) to, for example, Win32API which is drawing means provided by the OS, and causes Win32API to execute display of the EMF data in order to display the preview image based on image data generated by the preview driver 10 on the display 6, and also displays the judgment condition setting screen on the display 6.

Figure 3:
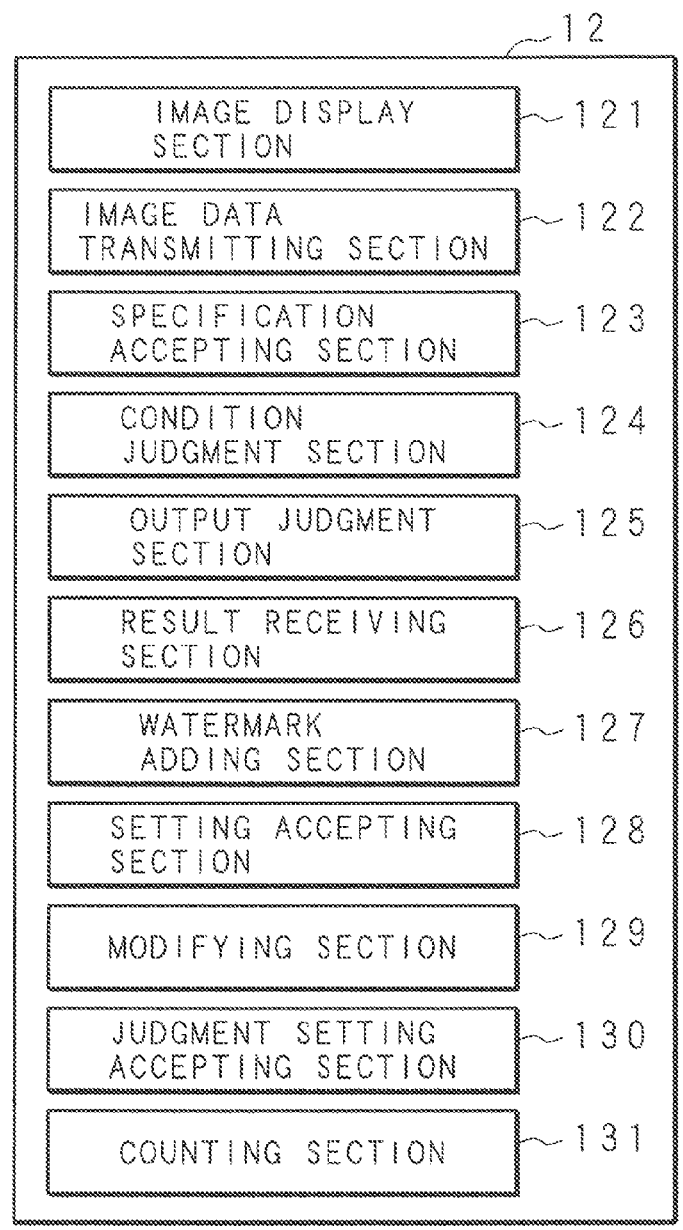
FIG. 3 is a functional block diagram showing essential configurations of a preview application of Embodiment 1 of the present invention.

FIG. 3 is a functional block diagram showing essential configurations of the preview application 12 of Embodiment 1 of the present invention. The preview application 12 comprises an image display section 121, an image data transmitting section 122, a specification accepting section 123, a condition judgment section 124, an output judgment section 125, a result receiving section 126, a watermark adding section 127, a setting accepting section 128, a modifying section 129, a judgment setting accepting section 130, and a counting section 131.

The image display section 121 (condition display section) displays a preview image based on the image data generated by the preview driver 10, said setting accepting screen, said judgment condition setting screen, a comment based on comment data received from an external device, etc., as described above.

Figure 4:
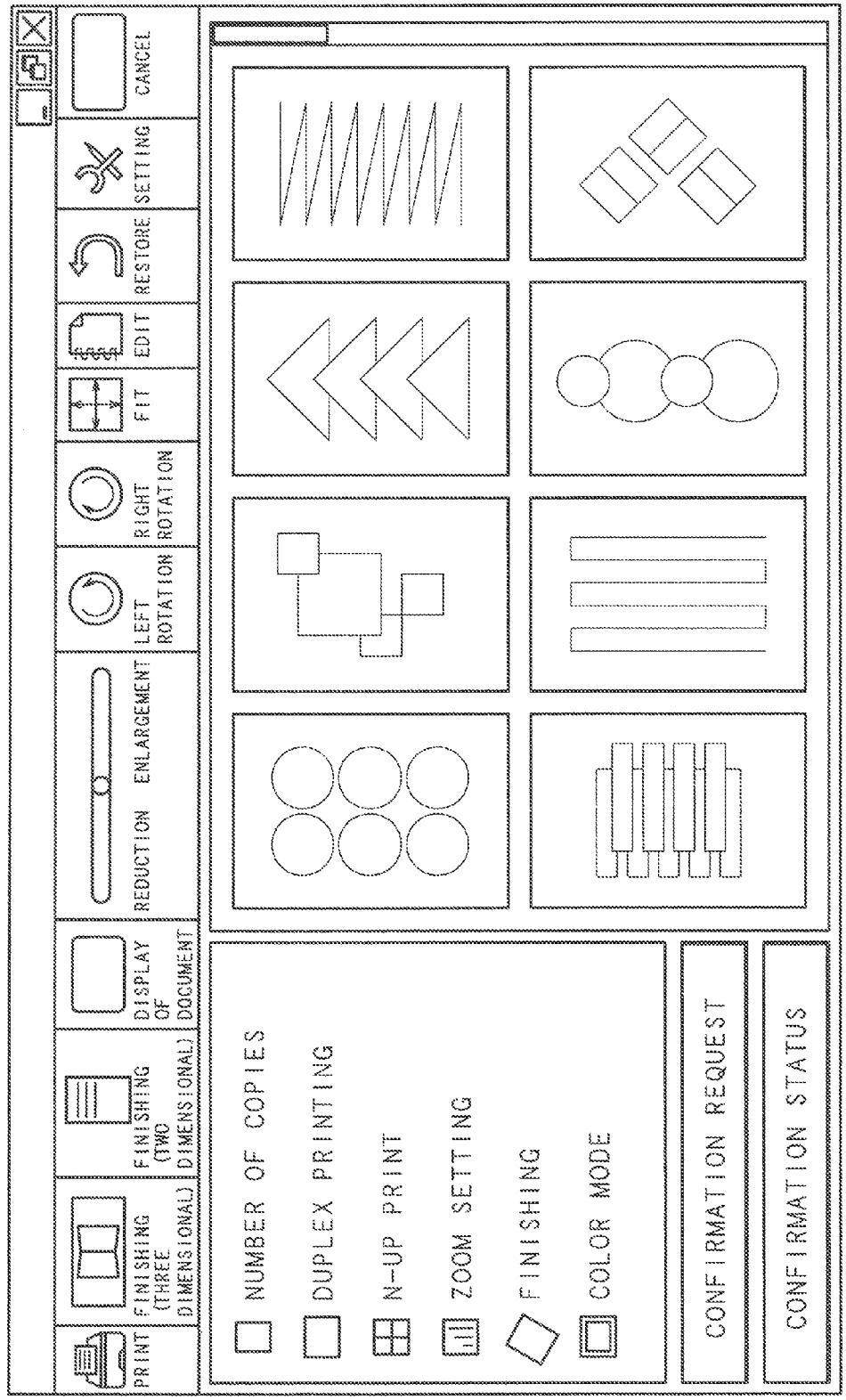
FIG. 4 is an exemplary view showing an example of a setting accepting screen in Embodiment 1 of the present invention.

FIG. 4 is an exemplary view showing an example of the setting accepting screen in Embodiment 1 of the present invention. The image display section 121 displays a preview image based on said image data on said setting accepting screen. Unable check it on the FIG. 4, since the preview images are displayed based on image data for preview image, the present invention allows a creating person to confirm more details of the preview image compared to a conventional simplified preview image formed using document data.

The setting accepting screen includes soft keys for accepting settings of print conditions and post-print processing conditions, such as the "Number of copies", "Duplex printing", and "Finishing". When a creating person suitably operates these soft keys, the setting accepting section 128 accepts the print conditions and post-print processing conditions via the setting accepting screen. For example, a creating person operates the "Duplex printing" soft key and selects duplex printing or single-sided printing to set a print condition, and operates the "Finishing" soft key to set a post-print processing condition, such as right-side binding or left-side binding.

Moreover, the setting accepting screen includes "Confirmation request" and "Confirmation status" soft keys. For example, when the "Confirmation request" soft key is operated by a creating person, the image data transmitting section 122 transmits EMF data concerning the document data or later-described condition reflection EMF data (image data) to a considering person, and requests confirmation permitting or not permitting output. On the other hand, when the "Confirmation status" soft key is operated by a creating person, the results of the confirmation permitting or not permitting output received from considering persons by the point in time are displayed as a list.

FIG. 5 is an exemplary view showing an example of the judgment condition setting screen in Embodiment 1 of the present invention. The image display section 121 displays an item of a "Confirmation request end" for determining a considering person to be requested confirmation permitting or not permitting output, on the judgment condition setting screen. For example, when the creating person marks several considering persons from considering persons displayed on the item of the "Confirmation request end", the condition reflection EMF data is sent to these considering persons, and the confirmation of the permitting or not permitting output of the document is requested.

The image display section 121 displays an item of a "Judgment condition setting" for setting a judgment condition used to finally judge permitting or not permitting output, when the result of confirmation permitting or not permitting output is received from each considering person, on the judgment condition setting screen. The item of the "Judgment condition setting" contains, as a 'judgment condition', 'a print is impossible unless O.K. from all the considering persons are not received', 'a print is possible even when O.K. from any considering person is received', 'a print is impossible unless O.K. from a majority of considering persons are not received', 'a print is possible only if O.K. from the specific considering person is received', etc. When the creating person selects any judgment condition displayed on the item of the "Judgment condition setting", the judgment setting accepting section 130 accepts a setting of the judgment condition via the judgment condition setting screen, and a decision of permitting or not permitting output of the document is finally made based on the judgment condition and the result of the confirmation permitting or not permitting output (namely, a later-described output permission instruction) received from each considering person.

For example, when the "Confirmation request" soft key of the setting accepting screen is operated in a output of predetermined document data, the image data transmitting section 122 (transmission section) transmits the EMF data or condition reflection EMF data (image data) concerning the document data to the considering person determined with the above-described procedure via the communication unit 7. At this time, the image data transmitting section 122 transmits to the considering person the image data and a data for requesting confirmation (confirmation permitting or not permitting output) of permitting or not permitting output of the document data concerning said image data. According to the request, the considering person sends to the creating person an output permission instruction which is an instruction representing permitting or not permitting the output of the document data.

The specification accepting section 123 (specification accepting section) accepts a setting of a specific considering person, when the condition that 'a print is possible only if OK from the specific considering person is received' is selected as the judgment condition. For example, when the creating person selects as the judgment condition the condition that 'a print is possible only if O.K. from the specific considering person is received', according to this selection, the same dialog box as the item of the above "Confirmation request end" is displayed as a pop-up image, the creating person marks any considering person as the specific considering person, and the specification accepting section 123 accepts a setting of one specific considering person.

The condition judgment section 124 (judgment section) judges whether or not the judgment condition is satisfied based on the judgment condition accepted by the judgment setting accepting section 130 via the judgment condition setting screen, and the result of the confirmation permitting or not permitting output received from each considering person.

The output judgment section 125 (output judgment section) judges whether or not the document data is outputted, that is, whether the document data is "able to be outputted" or "not able to be outputted", based on the result of the judgment by the condition judgment section 124. In detail, when the condition judgment section 124 judges that the judgment condition is satisfied, the output judgment section 125 judges that the document data is "able to be outputted", and when the condition judgment section 124 judges that the judgment condition is not satisfied, the output judgment section 125 judges that the document data is "not able to be outputted". When the output judgment section 125 judges that the document data is "able to be outputted", the document data, and the print conditions and the post-print processing conditions of said document data are sent to the printer driver 13, the printer driver 13 transmits them to the multi-function peripheral 400.

The result receiving section 126 (instruction acquiring section) receives the results of the confirmation permitting or not permitting output from the considering persons, and the result of the confirmation permitting or not permitting output from the specified considering person via the communication unit 7. The result receiving section 126 receives the comments (text data) from the PCs 100, 200 of the considering persons via the communication unit 7. The results of the confirmation permitting or not permitting output and the comments are received by the result receiving section 126 and are temporarily stored in the RAM 4.

The watermark adding section 127 (adding section) adds watermark data to the document data, for example, when an instruction to output the document data is accepted from a user (creating person) via the input unit 5, in spite of a case where the result of the confirmation permitting or not permitting output received by the result receiving section 126 represents that 'output of said document is not permitted' and the output judgment section 125 judges that said document data is not outputted.

The setting accepting section 128 (setting accepting section) accepts the settings of the print conditions and the post-print processing conditions of the document data via the setting accepting screen displayed on the display 6. When the setting accepting section 128 accepts the settings of the print conditions and the post-print processing conditions, the modifying section 129 modifies the image data for preview image already generated based on the document data received from the application 9, according to the accepted print conditions and post-print processing conditions, and the preview image based on the modified image data, i.e., the preview image on which said print conditions and said post-print processing conditions are reflected is displayed on the display 6.

When the setting accepting section 128 accepts the settings of the print conditions and the post-print processing conditions, the modifying section 129 (modifying section) modifies, on the preview application 12, the image data for preview image already generated based on the document data received from the application 9, according to the accepted print conditions and post-print processing conditions.

Therefore, in the present invention, the preview image on which not only the print conditions but also the post-print processing conditions are reflected is displayed immediately, thereby improving the realization of the creating person and the considering person.

The preview application 12 sends to the communication unit 7 or the printer driver 13 the EMF data (hereinafter referred to as condition reflected EMF data) containing the print conditions and the post-print processing conditions thus accepted by the setting accepting section 128, the document data, and the metadata for printing the document data. The condition reflected EMF data is transmitted to the PC 100 or the PC 200 through the communication unit 7 for confirmation of permitting or not, permitting output, or is converted into a later-described PCL form by the printer driver 13 and is transmitted to the multi-function peripheral 400 through the communication unit 7.

The judgment setting accepting section 130 (condition selection accepting section) accepts the settings of the judgment condition and the considering person via the judgment condition setting screen, for example, when a creating person selects any judgment condition displayed on the item of the "Judgment condition setting" on the judgment condition setting screen shown in FIG. 5, or selects any considering person displayed on the item of the "Confirmation request end". The judgment condition and the considering person accepted by the judgment setting accepting section 130 are temporarily stored in the RAM 4.

The counting section 131 (counting section) counts the number of the considering persons concerning the setting accepted by the judgment setting accepting section 130 via the judgment condition setting screen, the number of output permission instructions received by the result receiving section 126, the number of output permission instruction of permitting output in the received output permission instructions, and the like.

The storage unit 8 is a non-volatile semiconductor memory such as a hard disk, and stores IP addresses of the personal computers (for example, the PC 100 and the PC 200) of the considering persons to be requested for confirmation permitting or not permitting output. For example, when confirmation permitting or not permitting output is requested, the image data transmitting section 122 transmits the EMF data or the condition reflected EMF data (image data) to a predetermined considering person based on the IP address stored in the storage unit 8.

The printer driver 13 converts the EMF data or the condition reflected EMF data (image data) acquired from the preview application 12 into data in a form (PCL) capable of being processed for printing by the multi-function peripheral 400, and transmits the resulting data to the multi-function peripheral 400. The multi-function peripheral 400 receives the PCL-form data, and prints an image based on the document data on a sheet according to the print conditions and the post-print processing conditions.

Figure 6:
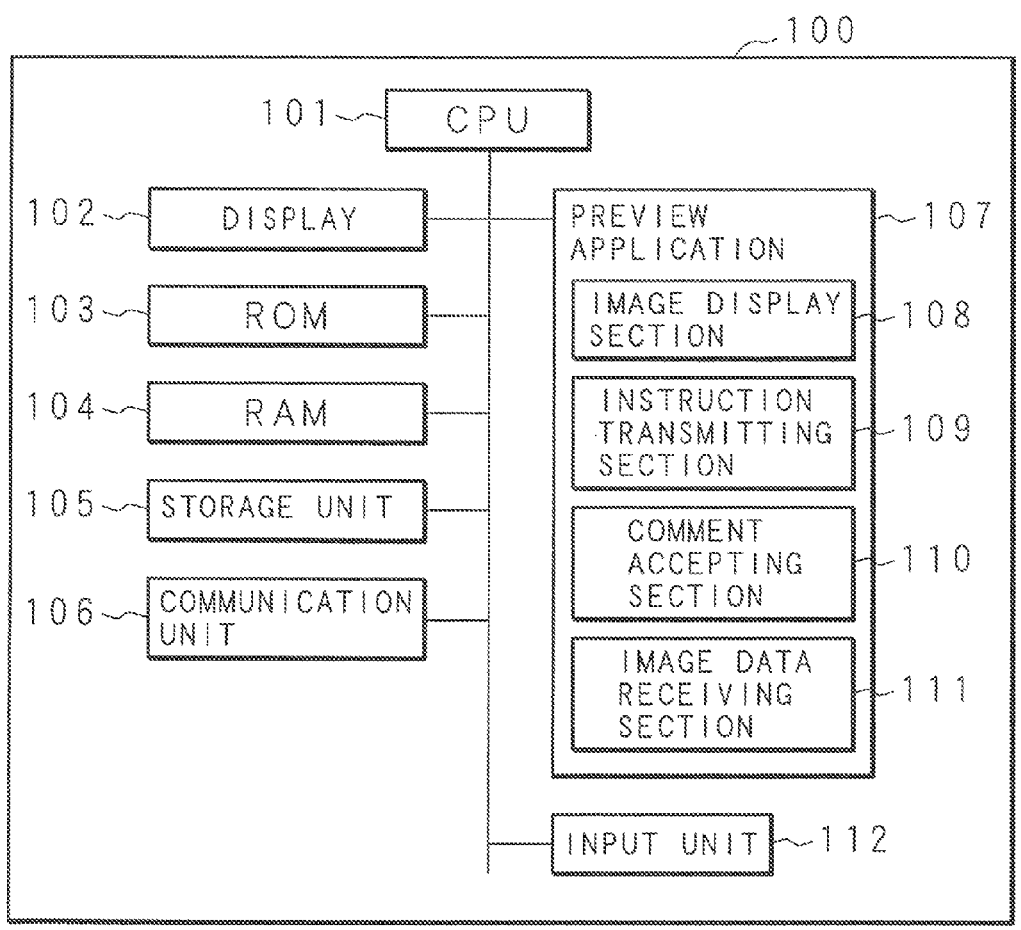
FIG. 6 is a functional block diagram for explaining essential configurations of a considering person's PC 100 in the output system according to Embodiment 1 of the present invention.

FIG. 6 is a functional block diagram for explaining essential configurations of a PC 100 of a considering person in the output system according to Embodiment 1 of the present invention. Note that the PC 100 and the PC 200 have the same configurations and the description of the PC 200 is omitted.

The PC 100 comprises a CPU 101, a ROM 103, a RAM 104, a storage unit 105, a preview application 107, an input unit 112, a display 102, and a communication unit 106.

The ROM 103 stores in advance various kinds of control programs, data for display of a later-described comment accepting screen etc., data which constitutes the output permission instruction of permitting or not permitting output etc., and the RAM 104 is capable of storing data temporarily and allows the data to be read regardless of the order, position etc. they are stored. The RAM 104 stores, for example, a program read from the ROM 103, various kinds of data generated by the execution of the program, and various kinds of data received from external devices.

The CPU 101 controls the above-described various hardware devices by loading on the RAM 104 the control program stored in the ROM 103 in advance and executing it, and operates the whole apparatus as the PC 100 of the considering person in Embodiment 1 of the present invention.

The input unit 112 comprises, for example, a keyboard, a mouse, etc. A considering person inputs data (comment) on the comment accepting screen using the input unit 112, and a later-described comment accepting section 110 accepts the comment from the considering person via the comment accepting screen.

The display 102 is a liquid crystal display, for example, a later-described image display section 108 displays on the display 102 the preview image based on the image data (for example, the condition reflected EMF data) received from the PC 1 of the creating person, and the comment accepting screen is displayed.

The communication unit 106 includes a network card, modem, etc. for receiving, for example, document data (for example, the condition reflected EMF data) and the request for confirmation permitting or not permitting output from the PC 1 and sending the result of the confirmation permitting or not permitting output (output permission instruction) etc. to the PC 1.

The storage unit 105 is a non-volatile semiconductor memory such as a hard disk, and stores the EMF data or condition reflected EMF data received from the creating person via the communication unit 106.

The preview application 107 displays a preview image on the display 102 to assist the considering person of realizing contents and a printed (outputted) status of the document, displays a comment accepting screen for the considering person to input a comment on the request for the confirmation permitting or not permitting output of the document with respect to the request for the confirmation permitting or not permitting output from the creating person of the document.

Figure 7:
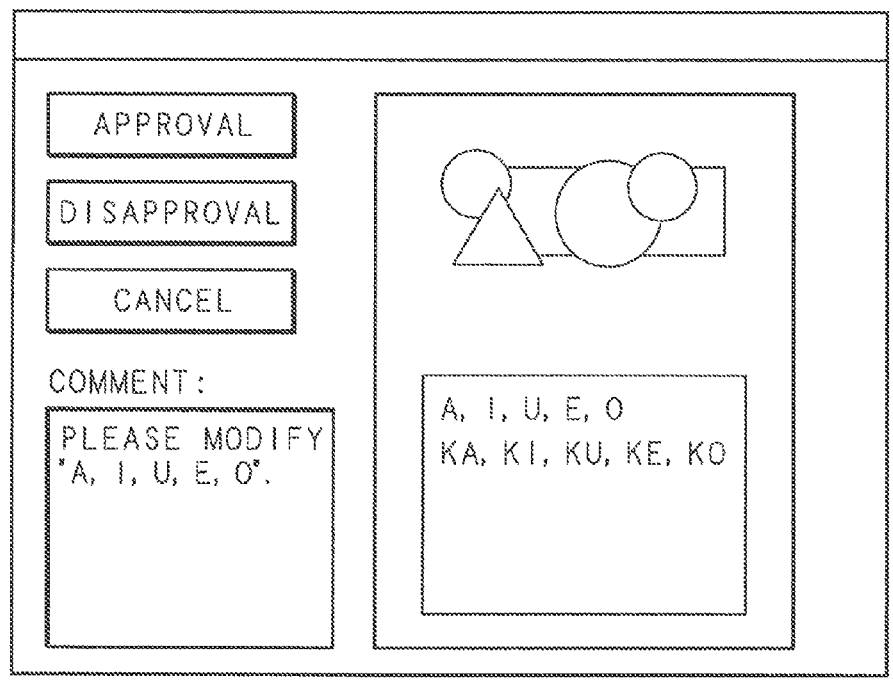
FIG. 7 is an exemplary view showing an example Of a comment accepting screen in Embodiment 1 of the present invention.

FIG. 7 is an exemplary view showing an example of the comment accepting screen in Embodiment 1 of the present invention. The preview image is displayed on the comment accepting screen based on the image data received from the creating person. Unable check it on the FIG. 7, since the preview image is displayed based on the image data for preview image, the present invention allows the considering person to confirm more details of the preview image compared to a conventional simplified preview image formed using document data.

Moreover, when the preview image based on the condition reflected EMF data is displayed, since the preview image on which not only the print conditions but also the post-print processing conditions are reflected is displayed, the considering person can confirm not only the contents of the document but also the post-print processing of the document in advance.

The comment accepting screen includes "Approval" and "Disapproval" soft keys for accepting the output permission instruction on the result of confirmation permitting or not permitting output. The output permission instruction of permitting the output of the document data is accepted via the "Approval" soft key, and the output permission instruction of not permitting the output of the document data is accepted via the "Disapproval" soft key. For example, when the considering person determines not to output the document as a result of consideration, he/she operates the "Disapproval" soft key to transmit the output permission instruction of the disapproval to the creating person. On the other hand, when the considering person determines to output the document, he/she operates the "Approval" soft key to transmit the output permission instruction of permitting output to the creating person.

Moreover, the comment accepting screen includes a text box for the considering person to input a comment on the result of the confirmation permitting or not permitting output of the document, and the considering person may input a comment on the text box using the input unit 112.

The data concerning the comment and the output permission instruction thus accepted via the comment accepting screen is sent to the communication unit 106, and is transmitted to the PC 1 via the communication unit 106.

The preview application 107 comprises an image display section 108, an instruction transmitting section 109, a comment accepting section 110, and an image data receiving section 111.

The image display section 108 (image display section) sends the image data (EMF data or condition reflected EMF data) to the Win32API, causes Win32API to execute display of the EMF data in order to display the preview image based on the image data received from the creating person on the display 102, and also displays the comment accepting screen on the display 102.

The instruction transmitting section 109 (instruction transmitting section) transmits the output permission instruction of not permitting the output of the document to the PC 1 of the creating person using the data stored in the ROM 103 when the "Disapproval" soft key of the comment accepting screen is operated by the considering person. On the other hand, when the "Approval" soft key is operated by the considering person, the instruction transmitting section 109 (instruction transmitting section) transmits the output permission instruction, of permitting the output of the document to the PC 1 of the creating person using the data stored in the ROM 103. Moreover, the comment (text data) accepted by the comment accepting section 110 is transmitted to the PC 1 of the creating person.

The comment accepting section 110 (accepting section) accepts a comment (text data) via the text box of the comment accepting screen when the considering person inputs a comment using the input unit 112 to the text box of the comment accepting screen. The comment (text data) accepted by the comment accepting section 110 is stored in the storage unit 105, and is transmitted to the PC 1 of the creating person with the output permission instruction.

The image data receiving section 111 (acquiring section) receives the image data (EMF data or condition reflected EMF data) sent from the creating person via the communication unit 106, and stores the image data to the storage unit 105.

Figure 8:
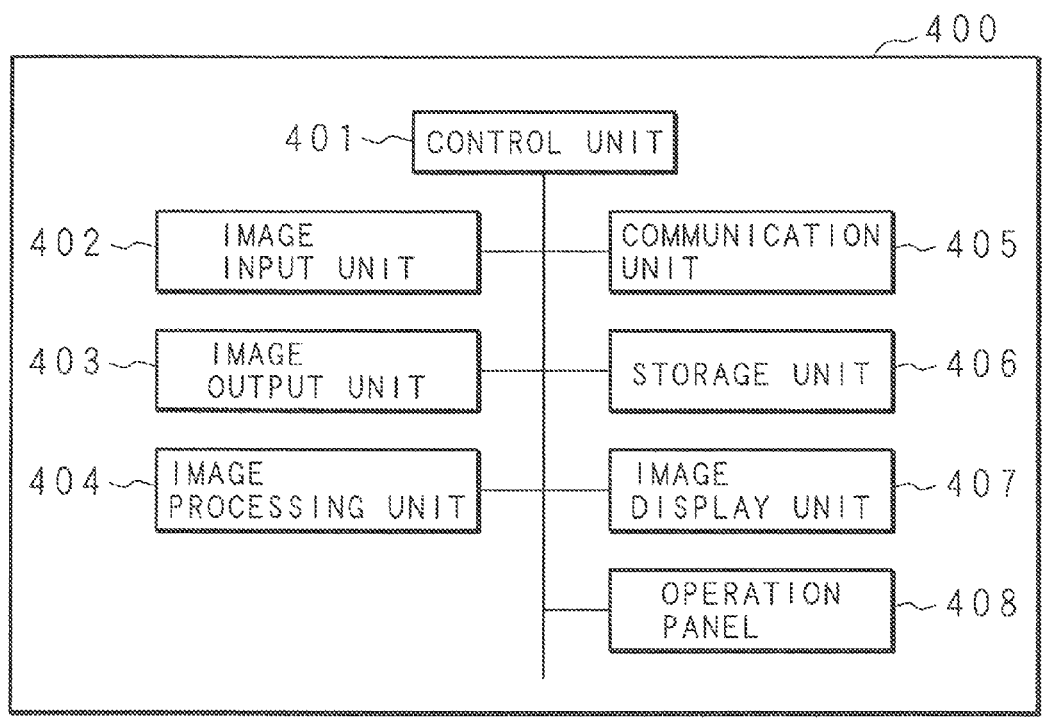
FIG. 8 is a functional block diagram for explaining essential configurations of a multi-function peripheral in the output system according to Embodiment 1 of the present invention.

FIG. 8 is a functional block diagram for explaining essential configurations of the multi-function peripheral 400 in the output system according to Embodiment 1 of the present invention.

The multi-function peripheral 400 comprises: an image input unit 402; an image output unit 403; an image processing unit 404; a communication unit 405; an image display unit 407; a storage unit 406; and an operation panel 408. These hardware devices are connected to a control unit 401 by a bus.

The image input unit 402 comprises: a light source for irradiating light on a document to be read; and an image sensor such as a CCD (Charge Coupled Device), and optically reads image data of the document. In the image input unit 402, a reflected light image from a document set on a given read position is focused onto the image sensors, and RGB (R: Red, G: Green, B: Blue) analog data are outputted.

The image output unit 403 prints an image based on image data outputted from the image processing unit 404 on a sheet of record paper, an OHP film, etc. The image output unit 403 comprises: a photosensitive drum; a charger for charging the photosensitive drum to a given electric potential; a laser writer for generating an electrostatic latent image on the photosensitive drum by emitting laser light according to image data received from an external device; a developing device for supplying toner to the electrostatic latent image formed on a surface of the photosensitive drum to visualize the image; and a transfer device for transferring the toner image formed on the surface of the photosensitive drum to a sheet, and the like, and for example, forms the image on the sheet by an electro-photographic method.

The communication unit 405 includes a network card, a modem, etc. for receiving the document data, the print conditions and the post-print processing conditions from an external device such as the PC 1, and transmits image data after being processed by the image processing unit 404 to an external device via the network card, modem, etc.

The storage sections 406 is a non-volatile semiconductor memory such as a hard disk, and stores the image data of the document acquired via the image input unit 402, or the document data (EMF data or condition reflected EMF data) received from the PC 1 via the communication unit 405.

The operation panel 408 includes: function buttons for switching functions, such as "Fax", "Copy", "Print", and "Mail", of the multi-function peripheral 400; numeric keypad; the Enter key for entering an accepted instruction; and the "Output" key or the "Copy" key for forming an image of a document read by the image input unit 402 on a sheet, etc.

The image display unit 407 is composed of a liquid crystal display as an example, and displays information to be reported to the user, such as the status of the multi-function peripheral 400, the status of a job processing, an image of a document read by the image input unit 402, and the confirmation of the content of operation of the operation panel 408.

The image processing unit 404 generates digital image data based on analog data inputted from the image input unit 402 as an example, or it reads but image data stored in the storage unit 406, performs processing according to the type of each image, and generates output image data. The output image data generated by the image processing unit 404 is outputted to the image output unit 403, or the communication unit 405.

The control section 101 comprises a CPU, a ROM, and a RAM (not shown). The ROM stores various kinds of control programs, data, etc. in advance. The RAM is capable of storing data temporarily and allows the data to be read regardless of the order, position etc. they are stored. The RAM stores, for example, a program read from the ROM, various kinds of data generated by the execution of the programs, etc.

Figure 9:
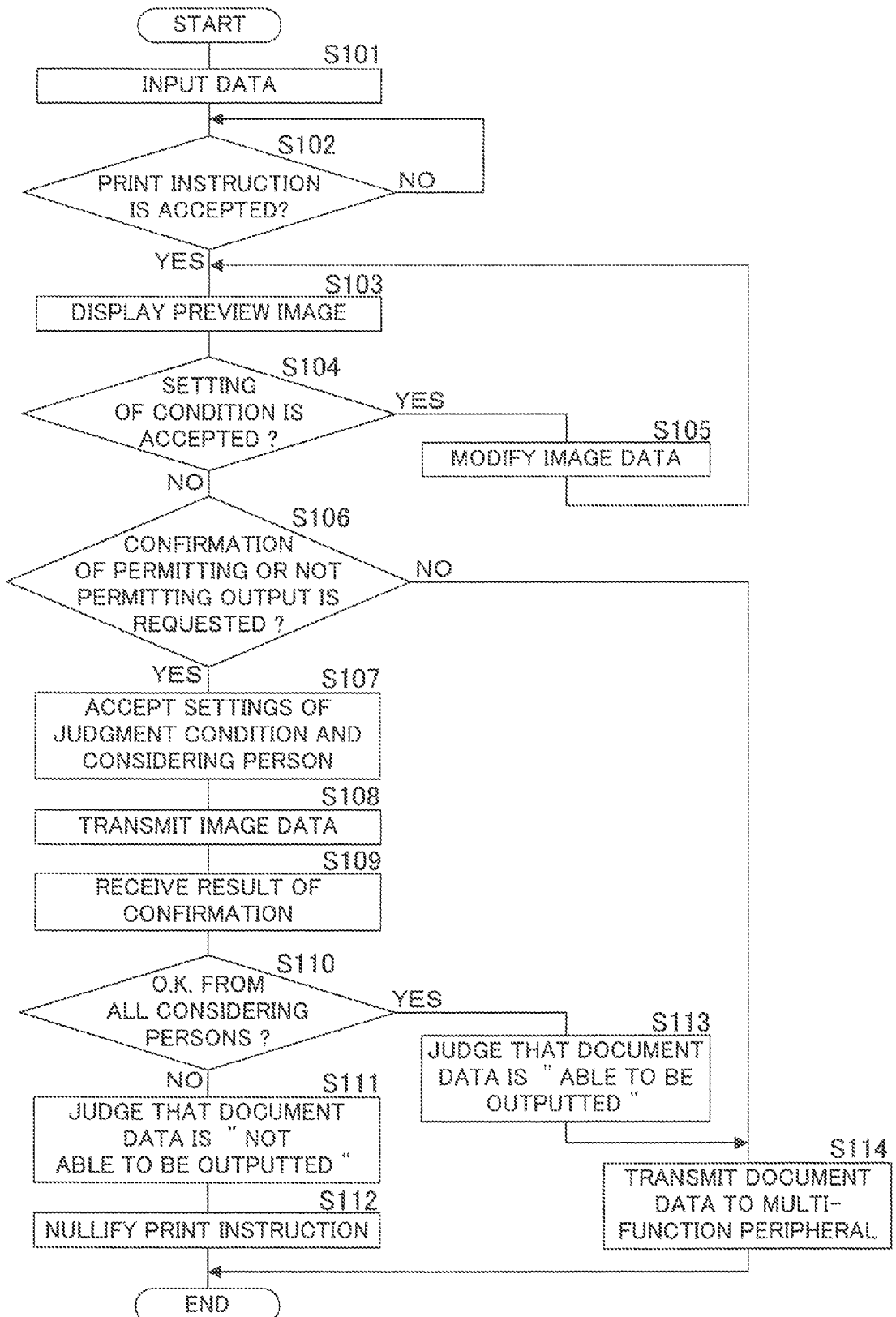
FIG. 9 is a flow chart for explaining an operation of the creating person's PC in the output system according to Embodiment 1 of the present invention.

FIG. 9 is a flow chart for explaining an operation of the creating person's PC in the output system according to Embodiment 1 of the present invention. For convenience of description, a case is explained as an example, in which a creating person transmits a document data created in the PC 1 to the PC 100 and the PC 200, and requests confirmation permitting or not permitting output. Suppose that when the condition that 'a print is impossible unless O.K. from all the considering persons are not received' is set as the judgment condition, i.e., only when the output permission instruction (result of confirmation permitting or not permitting output) of permitting output is accepted from all of the PC 100 and the PC 200, the document data can be outputted.

For example, a creating person operates the input unit 5 of the PC 1 to input data via the input unit 5 (Step S101). Based on the inputted data, document data is created on the application 9.

The CPU 2 judges whether or not a print instruction of the document data is accepted based on a signal received from the input unit 5 and coordinates on a screen of the display 6, etc. (Step S102). For example, a "Print" soft key is provided at a predetermined position on the screen, and the CPU 2 monitors an operation of the "Print" soft key based on a signal received from the input unit 5 and coordinates on the screen of the display 6, etc.

For example, when the "Print" soft key is not operated since the creating person is still creating a document, the CPU 2 judges that the print instruction of the document data is not accepted (Step S102: NO), and it waits until the print instruction is accepted.

On the other hand, when the creating person completes creation of the document, and operates the "Print" soft key using, for example the mouse in order to instruct to print the document data, the CPU 2 judges that the print instruction of the document data is accepted (Step S102: YES), and the preview driver 10 starts up.

The preview driver 10 generates image data for preview image (EMF data) corresponding to the document data based on the document data received from the application 9 and information received from the printer driver 13. The EMF data contains the document data and metadata for printing the document data. At this time, the preview application 12 (image display section 121) is activated, and displays the setting accepting screen on the display 6. Moreover, the image display section 121 displays a preview image based on the EMF data by the above-described method on the display 6 (Step S103).

At this time, the CPU 2 monitors an operation of the soft key of the setting accepting screen to judge whether or not the settings of the print (output) conditions or the post-print (post-output) processing conditions are accepted (Step S104).

When the creating person operates the soft key of the setting accepting screen and the setting accepting section 128 accepts the settings of the print conditions or the post-print processing conditions, the CPU 2 judges that the settings of the print conditions or the post-print processing conditions are accepted (Step S104: YES), and the modifying section 129 modifies the already generated image data for preview image based on the print conditions and the post-print processing conditions accepted by the setting accepting section 128 (Step S105).

Then, the processing returns to Step S103, the preview image based on the modified new image data for preview image, i.e., the preview image on which the print conditions and the post-print processing conditions are reflected is displayed again (Step S103).

On the other hand, when the CPU 2 judges the settings of the print conditions or the post-print processing conditions are not accepted (Step S104: NO), it judges whether or not confirmation permitting or not permitting output of the created document data is requested (Step S106). The judgment is performed by, for example, the CPU 2 monitoring an operation of the "Confirmation request" soft key of the setting accepting screen shown in FIG. 4.

For example, when the creating person does not operate the "Confirmation request" soft key of the setting accepting screen for a predetermined time, the CPU 2 judges the confirmation permitting or not permitting output of the document data is not requested (Step S106: NO), and instructs to send to the printer driver 13 the document data and the print conditions and the post-print processing conditions of the document data.

According to the instructions of the CPU 2, the preview application 12 sends the document data, the print conditions and the post-print processing conditions to the printer driver 13, and they are converted into the PCL form by the printer driver 13, the resulting data is transmitted to the multi-function peripheral 400 via the communication unit 7 (Step S114).

On the other hand, when the creating person operates the "Confirmation request" soft key of the setting accepting screen and the CPU 2 judges that the confirmation permitting or not permitting output of the document data is requested (Step S106: YES), the image display section 121 displays the judgment condition setting screen as shown in FIG. 5 on the display 6.

Subsequently, the creating person operates the item of the "Judgment condition setting" of the judgment condition setting screen and the item of the "confirmation request end" with the above-described procedure, the judgment setting accepting section 130 accepts the settings of the judgment conditions and the considering persons via the judgment condition setting screen (Step S107). The data showing the judgment conditions and the considering persons accepted by the judgment setting accepting section 130 is temporarily stored in the RAM 4.

The image data transmitting section 122 transmits the image data (EMF data) concerning the preview image displayed on the display 6 at Step S103 or displayed on the display 6 at Step S103 after Step S105, to the considering person concerning the setting accepted by the judgment setting accepting section 130 at Step S107 (Step S108), and requests the confirmation permitting or not permitting output. Said image data is stored in the storage unit 8.

Then, said considering person performs confirmation permitting or not permitting output, and transmits to the PC 1 the output permission instruction and comment which are the result of the confirmation permitting or not permitting output. At this time, the result accepting section 126 receives the output permission instruction (result of confirmation permitting or not permitting output) from the considering person via the communication unit 7 (Step S109). The output permission instruction is received by the result receiving section 126 and is temporarily stored in the RAM 4.

After a predetermined time has lapsed, the creating person confirms a reception of the output permission instruction for the document data using the preview application 12. At this time, the condition judgment section 124 judges whether or not the judgment condition is satisfied, based on the setting of the judgment condition accepted by the judgment setting accepting section 130 via the judgment condition setting screen, and the output permission instruction from each considering person. Based on a result of the judgment of the condition judgment section 124, the output judgment section 125 judges whether or not the document data is printed (outputted). Since, in the present embodiment, the condition that 'a print is impossible unless O.K. from all the considering persons are not received' is set as the judgment condition, the condition judgment section 124 judges whether or not all the output permission instructions from the respective considering persons represent permitting output (Step S110).

When the condition judgment section 124 judges that all the output permission instructions from the respective considering persons represent permitting output (Step S110: YES), that is, when the judgment condition is satisfied, the output judgment section 125 judges that the document data is "able to be outputted" (Step S113).

Thereafter, the processing proceeds to Step S114. For example, when the output of the document data is confirmed by the creating person, and the preview application 12 reads out the image data stored in the storage unit 8 after being transmitted to the considering persons at Step S108, and sends it to the printer driver 13. The image data is converted into the PCL form by the printer driver 13, and is transmitted to the multi-function peripheral 400 via the communication unit 7 (Step S114).

On the other hand, when the condition judgment section 124 judges that all the output permission instructions from the respective considering persons represent not permitting output (Step S110: NO), for example, when the judgment condition is not satisfied because there is even one output permission instruction of not permitting output, the output judgment section 125 judges that the document data is not "able to be outputted" (Step S111). In this case, the CPU 2 nullifies the print instruction accepted at Step S102 (Step S112), and completes the processing.

At this time, the creating person can operate the "Confirmation status" soft key of the setting accepting screen (see FIG. 4) and confirm the details of the output permission instruction received from the considering persons.

FIG. 10 is an exemplary view showing an example of a detailed check-up screen of the received output permission instruction in the output system according to Embodiment 1 of the present invention. In the detailed check-up screen, each considering person (confirmation request end), and whether the output permission instruction from each considering person represents 'Output is approved' or 'Output is disapproved' are displayed. Moreover, when the result receiving section 126 receives a comment from the considering person, the comments is further displayed.

For example, suppose that after the output judgment section 125 judges that the document data is not "able to be outputted" and the accepted print instruction is cancelled, the output instruction of said document data is accepted from a user again. In this case, the watermark adding section 127 adds the watermark data stored in the ROM 3 to the document data. Therefore, the document data in which the watermark data is added is converted into the PCL form by the printer driver 13, and is transmitted to the multi-function peripheral 400, and an image based on the document data is printed on a sheet. Since visible watermark information, a hiding character, etc. are displayed on the printed matter, print of the document data in which permission of print from a considering person is not obtained may be restricted.

Note that the present invention is not limited to such a configuration, and when, after the output judgment section 125 judges that the document data is not "able to be outputted" and the accepted print instruction is nullified, the output instruction of said document data is accepted from a user again, said document data in color may be printed in black and white.

On the other hand, in the PC100 and the PC 200 of the considering persons, a preview image is displayed based on the image data (EMF data) sent from the PC 1 of the creating person, the considering persons perform the confirmation permitting or not permitting output using the preview image, and transmits to the PC 1 the output permission instruction and comment which are the results of the confirmation permitting or not permitting output.

Figure 11:
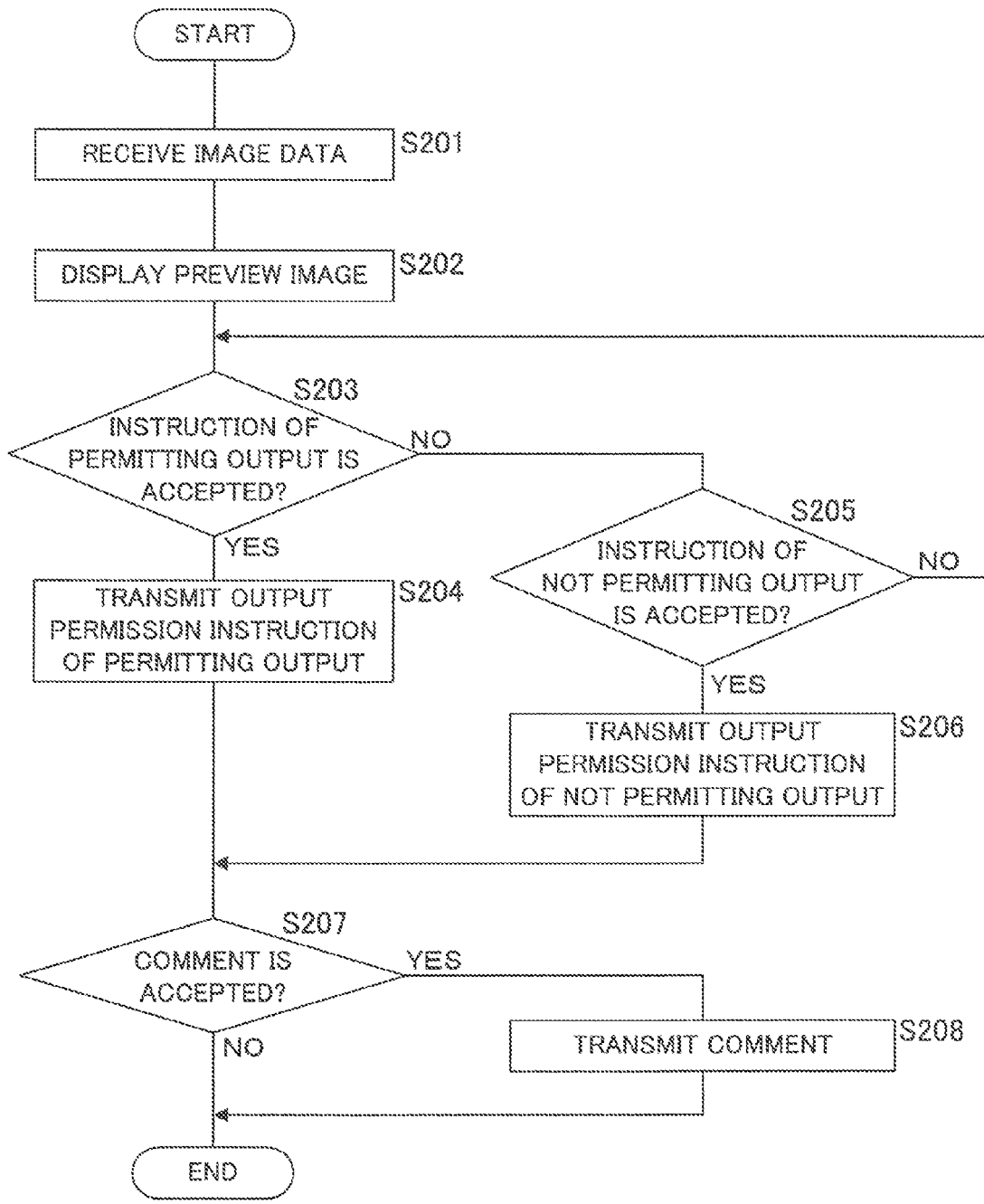
FIG. 11 is a flow chart for explaining an operation of the considering person's PC in the output system according to Embodiment 1 of the present invention.

FIG. 11 is a flow chart for explaining an operation of the PC 100 of the considering person in the output system according to Embodiment 1 of the present invention. For convenience of description, only the operation of the PC 100 is explained.

When the image data (EMF data) is transmitted from the PC 1 of the creating person, the image data receiving section 111 of the PC 100 receives the image data via the communication unit 106 (Step S201), and temporarily stores it in the RAM 104.

Subsequently, the preview application 107 is activated, and the image display section 108 displays the preview image based on the image data received from the creating person on display 102 with the above-described procedure (Step S202), and displays the comment accepting screen on the display 102.

The considering person of the PC 100 performs the confirmation whether or not the output of the document data concerning the preview image is permitted or not, while realizing the preview image displayed on the display 102. The considering person operates the "Approval" soft key (see FIG. 7) of the comment accepting screen, when he/she judges that the output of the document data is permitted as a result of the confirmation permitting or not permitting output. On the other hand, when the considering person judges that the output of the document data is not permitted, he/she operates the "Disapproval" soft key (refer to FIG. 7) of the comment accepting screen. If there is a matter to be transmitted to the creating person of the document data, the considering person inputs a comment into the text box of the "Comment" of the comment accepting screen using the input unit 112.

The CPU 101 (instruction accepting section) accepts an output permission instruction via the comment accepting screen, and judges whether or not the accepted output permission instruction is an output permission instruction of "permitting" output, based on the signal received from the input unit 112 and the coordinates on the comment accepting screen of the display 102, etc. (Step S203).

When the considering person operates the "Approval" soft key, the CPU 101 judges that the accepted output permission instruction is an output permission instruction of "permitting" output (Step S203: YES), and the instruction transmitting section 109 transmits the output permission instruction of permitting output of the document data via the communication unit 106 to the creating person using the data stored in the ROM 103 (Step S204).

On the other hand, when the CPU 101 judges that the accepted output permission instruction is not an output permission instruction of "permitting" output (Step S203: NO), that is, when the "approval" soft key is not operated by the considering person, the CPU 101 judges whether or not the accepted output permission instruction is an output permission instruction of "not permitting" output, based on the signal received from the input unit 112 and the coordinates on the comment accepting screen of the display 102, etc. (Step S205).

For example, when the "Disapproval" soft key is operated by the considering person, the CPU 101 judges that the accepted output permission instruction is an output permission instruction of "not permitting" output (Step S205: YES), and the instruction transmitting section 109 transmits the output permission instruction of not permitting output of the document data via the communication unit 106 to the creating person using the data stored in the ROM 103 (Step S206).

On the other hand, when the CPU 101 judges that the accepted output permission instruction is not an output permission instruction of "not permitting" output (Step S205: NO), that is, when the "Disapproval" soft key is not operated by the considering person, the CPU 101 returns the processing to Step S203 again.

After transmitting the output permission instruction of permitting output of the document data to the creating person at Step S204, or after transmitting the output permission instruction of not permitting output of the document data to the creating person at Step S206, the CPU 101 judges whether or not a comment is accepted (Step S207). For example, the CPU 101 performs the judgment by confirming whether or not a comment (text data) accepted by the comment accepting section 110 is stored in the storage unit 105.

When the CPU 101 judges that the comment is accepted (Step S207: YES), the instruction transmitting section 109 transmits the comment (text data) accepted by the comment accepting section 110 to the creating person of the document data (Step S208).

On the other hand, when the CPU 101 judges that the comment is not accepted (Step S207: NO), it completes the processing.

In above description, although the case where the output system according to the present invention comprises the PC 1, the PC 100, the PC 200, and the multi-function peripheral 400 is explained as an example, the present invention is not limited to this. For example, a server may be provided for the output system according to the present invention. That is, the document data (output data) created in the PC 1 of the creating person is stored in the server, and this server may serve as the preview application 12 of the PC 1.

Embodiment 2

Figure 12:
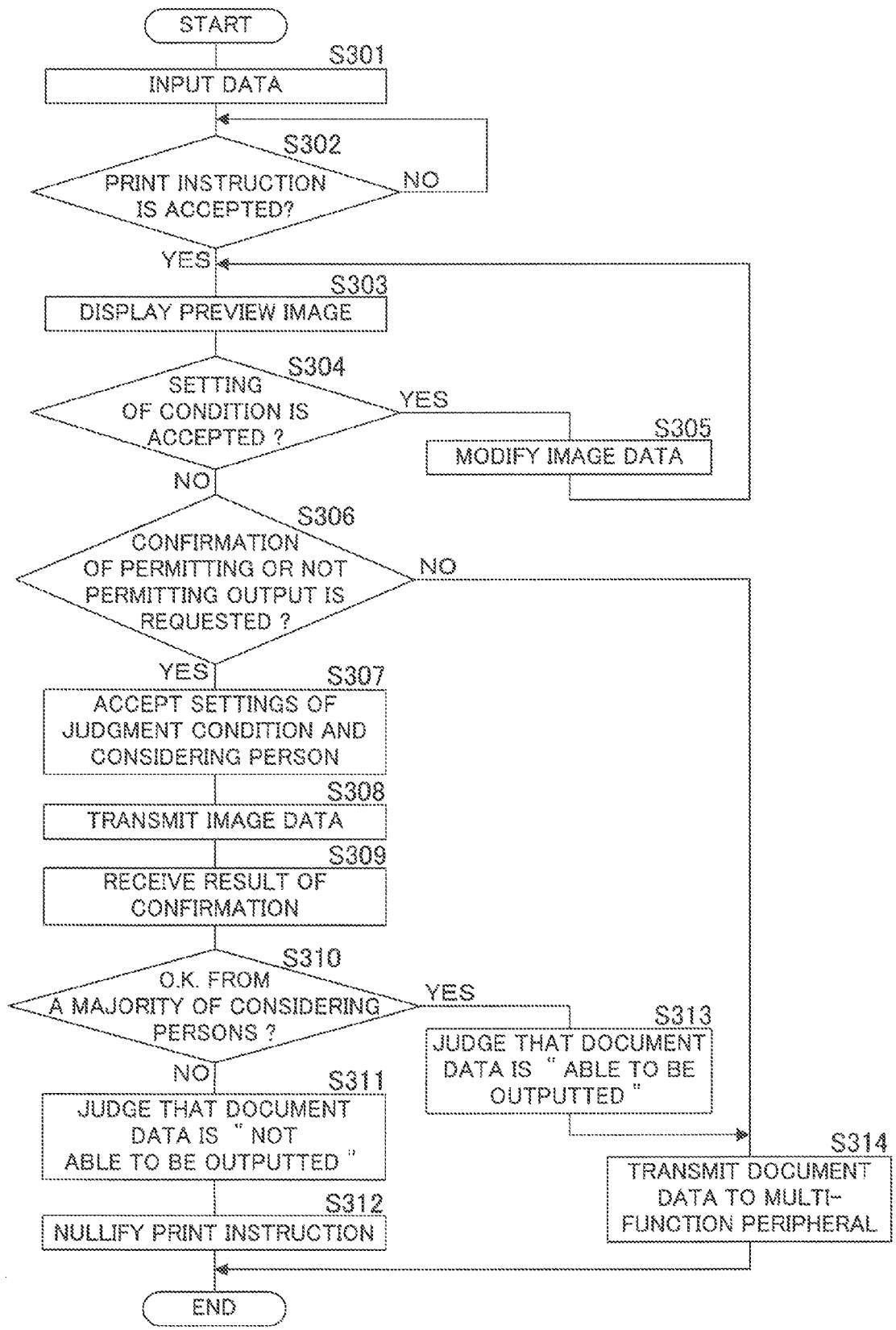
FIG. 12 is a flow chart for explaining an operation of the creating person's PC in the output system according to Embodiment 2 of the present invention.

FIG. 12 is a flow chart for explaining an operation of the creating person's PC 1 in the output system according to Embodiment 2 of the present invention. For convenience of description, a case is explained as an example, in which a creating person transmits document data created in the PC 1 to the PC 100 and the PC 200 and requests confirmation permitting or not permitting output. Note that in Embodiment 2, suppose that when the condition that 'a print is impossible unless O.K. from a majority of considering persons are not received' is set as the judgment condition, that is, when the output permission instruction of permitting output (result of confirmation permitting or not permitting output) is accepted from a majority of the PC 100 and the PC 200, i.e., one of these, the document data can be outputted.

For example, when the creating person operates the input unit 5 of the PC 1 to input data (Step S301), document data is created on the application 9.

The CPU 2 judges whether or not a print instruction of the document data is accepted from the creating person with the same procedure as Embodiment 1 (Step S302). When the CPU 2 judges that the print instruction of the document data is not accepted (Step S302: NO), it waits until the print instruction is accepted. On the other hand, when the CPU 2 judges that the print instruction of the document data is accepted (Step S302: YES), the preview driver 10 is activated.

The preview driver 10 generates image data for preview image corresponding to the document data (EMF data). The EMF data contains the document data and metadata for printing the document data. At this time, the preview application 12 (image display section 121) is activated, and the setting accepting screen is displayed on the display 6. The image display section 121 displays a preview image based on the EMF data on the display 6 with the above-described method (Step S303).

In this case, the CPU 2 judges whether or not settings of the print conditions or the post-print processing conditions is accepted with the same procedure as Embodiment 1 (Step S304). When the CPU 2 judges that the setting of the print conditions or the post-print processing conditions is accepted (Step S304: YES), the modifying section 129 modifies the already generated image data for preview image based on the print conditions and the post-print processing conditions accepted by the setting accepting section 128 (Step S305).

Then, the processing returns to Step S303 and a preview image based on the modified new image data for preview image is displayed again (Step S303).

On the other hand, when the CPU 2 judges that the setting of the print conditions or the post-print processing conditions is not accepted (Step S304: NO), it judges whether or not the confirmation permitting or not permitting output of the created document data is requested with the same procedure as Embodiment 1 (Step S306).

When the CPU 2 judges that the confirmation permitting or not permitting output of the document data is not requested (Step S306: NO), the document data and the print conditions and the post-print processing conditions of the document data are sent to the printer driver 13, and these are converted into the PCL form by the printer driver 13 and are transmitted to the multi-function peripheral 400 via the communication unit 7 (Step S314).

On the other hand, when the CPU 2 judges that the confirmation permitting or not permitting output of the document data is requested (Step S306: YES), the judgment setting accepting section 130 accepts settings of the judgment condition and the considering person via the judgment condition setting screen (Step S307).

The image data transmitting section 122 transmits image data (EMF data) concerning the preview image displayed on the display 6 at Step S303 or displayed on the display 6 at Step S303 after Step S305, to the considering person concerning the setting accepted by the judgment setting accepting section 130 at Step S307 (Step S308), and requests the confirmation permitting or not permitting output. Said image data is stored in the storage unit 8.

Then, the considering person performs the confirmation permitting or not permitting output, and transmits to the PC 1 the output permission instruction and the comment which are the result of the confirmation permitting or not permitting output. At this time, the result accepting section 126 receives an output permission instruction (result of the confirmation permitting or not permitting output) from the considering person via the communication unit 7 (Step S309).

After a predetermined time has lapsed, the creating person confirms a reception of the output permission instruction on the document data using the preview application 12. At this time, the condition judgment section 124 judges whether or not the judgment condition accepted by the judgment setting accepting section 130 is satisfied, and the output judgment section 125 judges whether or not the document data is printed (outputted) based on a result of the judgment of the condition judgment section 124.

In detail, the counting section 131 counts the number of the received output permission instruction (hereinafter referred to as received output permission instruction), and the number of the output permission instruction of permitting output in the received output permission instructions. Moreover, since, in the present embodiment, the condition that 'a print is impossible unless O.K. from a majority of considering persons are not received' is set as the judgment condition, the condition judgment section 124 performs said judgment by comparing the number of the received output permission instructions with the number of the output permission instruction of permitting output in the received output permission instructions using a result of counting of the counting section 131 (Step S310).

Note that the present invention is not limited to such a configuration, and the condition judgment section 124 may compare the number of all the considering persons (confirmation request ends) with the number of the output permission instruction of permitting output in the received output permission instructions to perform the judgment.

When the condition judgment section 124 judges that the number of the output permission instruction of permitting output in the received output permission instructions from the respective considering persons is the majority of the number of the received output permission instructions (Step S310: YES), that is, when the condition judgment section 124 judges that the judgment condition is satisfied, the output judgment section 125 judges that the document data is "able to be outputted" (Step S313).

Then, for example, when the output of the document data is confirmed by the creating person, the preview application 12 reads out the image data stored in the storage unit 8 after being transmitted to the considering persons at Step S308, and sends it to the printer driver 13, and the image data is converted into the PCL form by the printer driver 13 and is transmitted to the multi-function peripheral 400 via the communication unit 7 (Step S314).

On the other hand, when the condition judgment section 124 judges that the number of the output permission instruction of permitting output in the received output permission instructions from the respective considering persons is not the majority of the number of the received output permission instructions (Step S310: NO), that is, when the condition judgment section 124 judges that the judgment condition is not satisfied, the output judgment section 125 judges that the document data is "not able to be outputted" (Step S311). In this case, the CPU 2 nullifies the print instruction accepted at Step S302 (Step S312), and completes the processing.

The same parts as in Embodiment 1 are designated with the same reference numbers, and detailed explanations thereof will be omitted.

Embodiment 3

Figure 13:
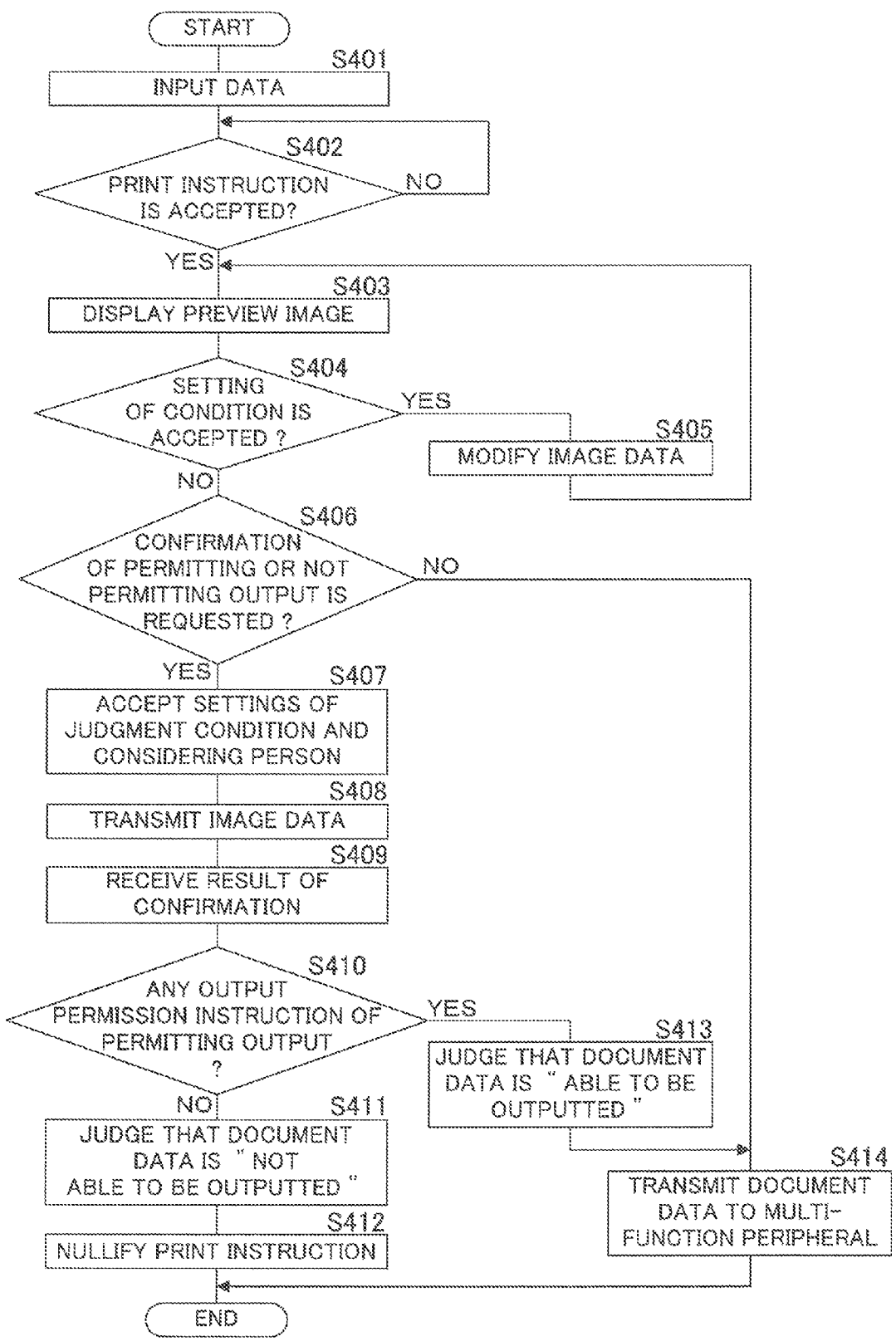
FIG. 13 is a flow chart for explaining an operation of the creating person's PC in the output system according to Embodiment 3 of the present invention.

FIG. 13 is a flow chart for explaining an operation of the creating person's PC 1 in the output system according to Embodiment 3 of the present invention. For convenience of description, a case is explained as an example, in which a creating person transmits document data created in the PC 1 to the PC 100 and the PC 200, and requests confirmation permitting or not permitting output. Moreover in Embodiment 3, suppose that when the condition that 'a print is possible even when O.K. from any considering person is received' is set as the judgment condition, i.e., when the output permission instruction of permitting output (result of confirmation permitting or not permitting output) is accepted from any of the PC 100 and the PC 200, the document data can be outputted.

For example, the creating person operates the input unit 5 of the PC 1 to input data (Step S401) and document data is created on the application 9.

The CPU 2 judges whether or not a print instruction of document data is accepted from the creating person with the same procedure as Embodiment 1 (Step S402). When the CPU 2 judges that the print instruction of the document data is not accepted (Step S402: NO), it waits until the print instruction is accepted. On the other hand, when the CPU 2 judges that the print instruction of the document data is accepted (Step S402: YES), the preview driver 10 is activated.

The preview driver 10 generates image data for preview image (EMF data) corresponding to the document data. The EMF data contains the document data and metadata for printing the document data. At this time, the preview application 12 (image display section 121) is activated, and the setting accepting screen is displayed on the display 6. Moreover, the image display section 121 displays a preview image based on the EMF data on the display 6 by the above-described method (Step S403).

At this time, the CPU 2 judges whether or not the setting of the print conditions or the post-print processing conditions is accepted with the same procedure as Embodiment 1 (Step S404). When the CPU 2 judges that the sating of the print conditions or the post-print processing conditions is accepted (Step S404: YES), the modifying section 129 modifies the already generated image data for preview image based on the print conditions and the post-print processing conditions accepted by the setting accepting section 128 (Step S405).

Then, the processing returns to Step S403 and a preview image based on the modified new image data for preview image is displayed again (Step S403).

On the other hand, when the CPU 2 judges that the setting of the print conditions or the post-print processing conditions is not accepted (Step S404: NO), it judges whether or not the confirmation permitting or not permitting output of the created document data is requested with the same procedure as Embodiment 1 (Step S406).

When the CPU 2 judges that the confirmation permitting or not permitting output of the document data is not requested (Step S406: NO), the document data and the print conditions and post-print processing conditions of the document data are sent to the printer driver 13, and they are converted into the PCL form by the printer driver 13 and are transmitted to the multi-function peripheral 400 via the communication unit 7 (Step S414).

On the other hand, when the CPU 2 judges that the confirmation permitting or not permitting output of the document data is requested (Step S406: YES), the judgment setting accepting section 130 accepts the settings of the judgment condition and the considering person via the judgment condition setting screen (Step S407).

The image data transmitting section 122 transmits image data (EMF data) concerning the preview image displayed on the display 6 at Step S403 or displayed on the display 6 at Step S403 after Step S405, to the considering person concerning the setting accepted by the judgment setting accepting section 130 at Step S407 (Step S408), and requests the confirmation permitting or not permitting output. Said image data is stored in the storage unit 8.

Then, the considering persons perform the confirmation permitting or not permitting output, and transmits to the PC 1 the output permission instruction and the comment which are the result of the confirmation permitting or not permitting output. At this time, the result accepting section 126 receives an output permission instruction (result of confirmation permitting or not permitting output) from the considering person via the communication unit 7 (Step S409).

After a predetermined time has lapsed, the creating person confirms a reception of the output permission instruction on the document data using the preview application 12. At this time, the condition judgment section 124 judges whether or not the judgment condition accepted by the judgment setting accepting section 130 is satisfied, and the output judgment section 125 judges whether or not the document data is printed (outputted) based on a result of the judgment of the condition judgment section 124. That is, since, in the present embodiment, the condition that 'a print is possible even when O.K. from any considering person is received' is set as the judgment condition, the condition judgment section 124 judges whether or not the number of the output permission instruction of permitting output in the received output permission instructions is at least one (Step S410).

When even one considering person transmits the output permission instruction of permitting output, that is, when the number of the output permission instruction of permitting output in the received output permission instructions is at least one, the condition judgment section 124 judges that the judgment condition is satisfied (Step S410: YES), and the output judgment section 125 judges that the document data is "able to be outputted" (Step S413).

Then, for example, when the output of the document data is confirmed by the creating person, the preview application 12 reads out the image data stored in the storage unit 8 after being transmitted to the considering person at Step S408 and sends it to the printer driver 13, and the image data is converted into the PCL form by the printer driver 13 and is transmitted to the multi-function peripheral 400 via the communication unit 7 (Step S414).

On the other hand, when it is judged that no considering person transmits the output permission instruction of permitting output, that is, when there is no output permission instruction of permitting output in the received output permission instructions, the condition judgment section 124 judges that the judgment condition is not satisfied (Step S410: NO), and the output judgment section 125 judges that the document data is "not able to be outputted" (Step S411). In this case, the CPU 2 nullifies the print instruction accepted at Step S402 (Step S412), and completes the processing.

The same parts as in Embodiment 1 are designated with the same reference numbers, and detailed explanations thereof will be omitted.

Embodiment 4

Figure 14:
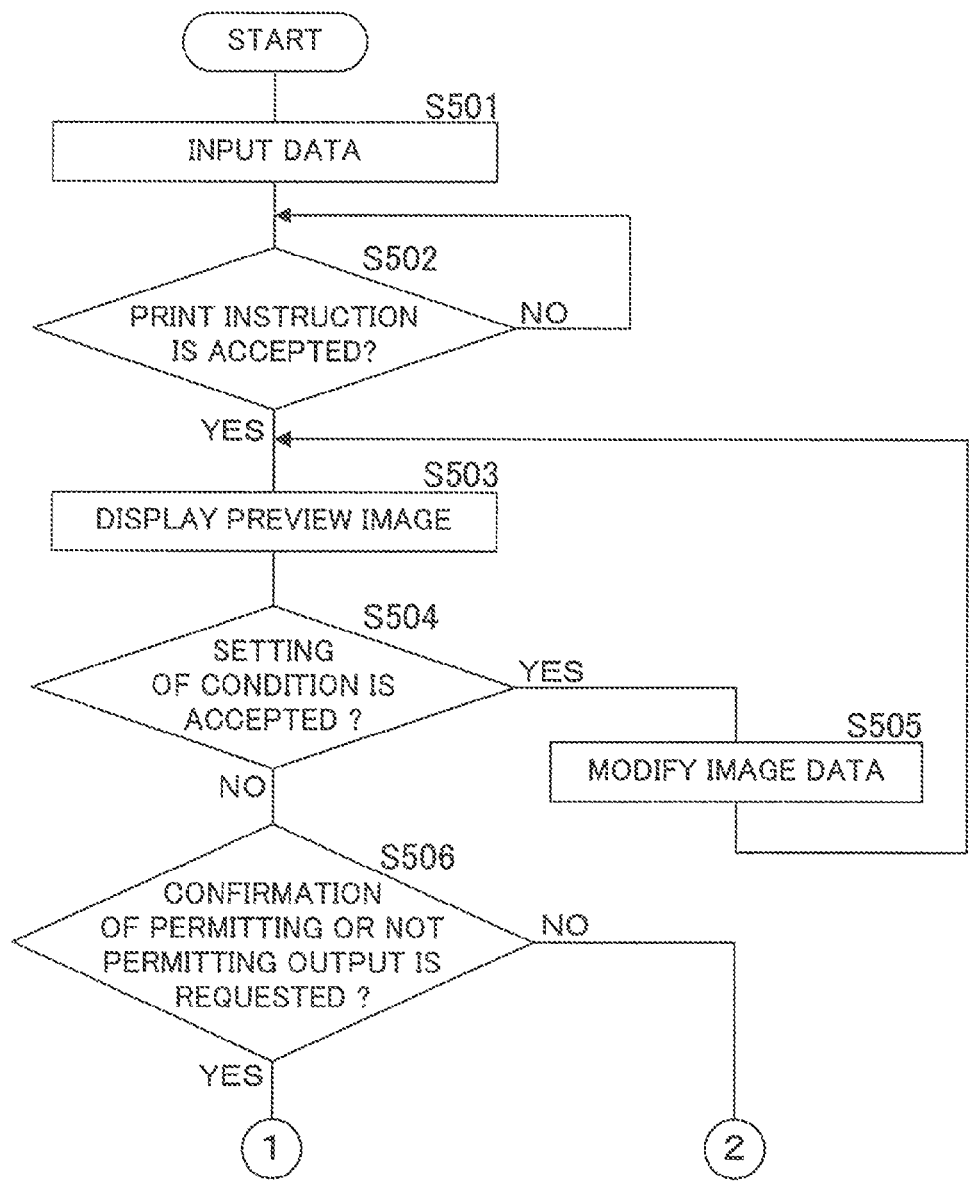
FIG. 14 is a flow chart for explaining an operation of the creating person's PC in the output system according to Embodiment 4 of the present invention.
Figure 15:
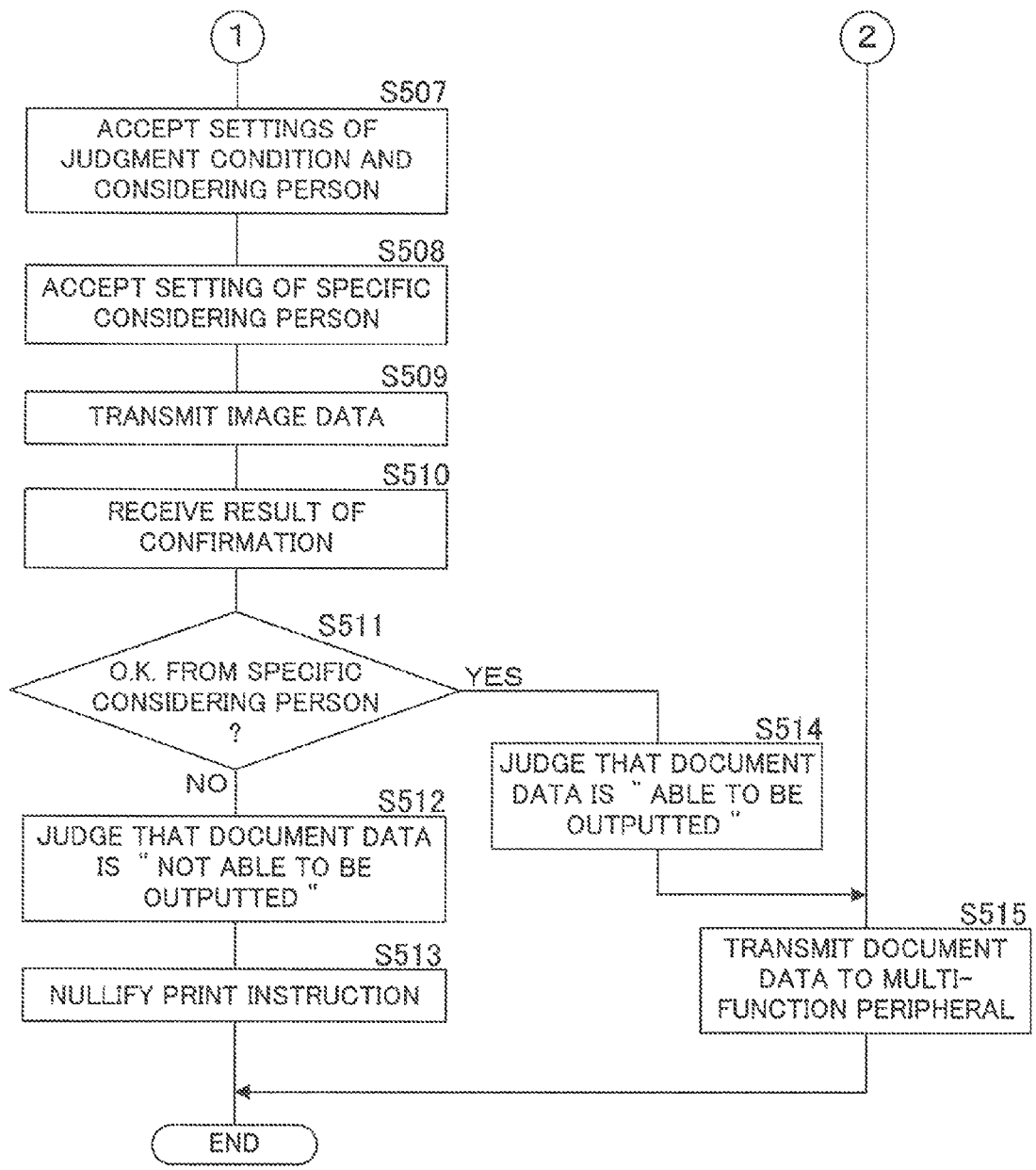
FIG. 15 is a flow chart for explaining an operation of the creating person's PC in the output system according to Embodiment 4 of the present invention.

FIGS. 14 and 15 are flow charts for explaining an operation of the creating person's PC 1 in the output system according to Embodiment 4 of the present invention. For convenience of description, a case is explained as an example, in which a creating person transmits document data created in the PC 1 to the PC 100 and the PC 200, and requests confirmation permitting or not permitting output. Moreover, in Embodiment 4, suppose that when the condition that 'a print is possible only if O.K. from the specific considering person is received' is set as the judgment condition, i.e., only when the output permission instruction of permitting output (result of confirmation permitting or not permitting output) is accepted from the specific considering person in the PC 100 and the PC 200, the document data can be outputted.

For example, the creating person operates the input unit 5 of the PC 1 to input data (Step S501) and document data is created on the application 9.

The CPU 2 judges whether or not a print instruction of document data is accepted from the creating person with the same procedure as Embodiment 1 (Step S502). When the CPU 2 judges that the print instruction of the document data is not accepted (Step S502: NO), it waits until the print instruction is accepted. On the other hand, when the CPU 2 judges that the print instruction of the document data is accepted (Step S502: YES), the preview driver 10 is activated.

The preview driver 10 generates image data for preview image (EMF data) corresponding to the document data. The EMF data contains the document data and metadata for printing the document data. At this time, the preview application 12 (image display section 121) is activated, and the setting accepting screen is displayed on the display 6. Moreover, the image display section 121 displays a preview image based on the EMF data on the display 6 with the above-described method (Step S503).

At this time, the CPU 2 judges whether or not the setting of the print conditions or the post-print processing conditions is accepted with the same procedure as Embodiment 1 (Step S504). When the CPU 2 judges that the setting of the print conditions or the post-print processing conditions is accepted (Step S504: YES), the modifying section 129 modifies the already generated image data for preview image based on the print conditions and the post-print processing conditions accepted by the setting accepting section 128 (Step S505).

Then, the processing returns to Step S503 and a preview image based on the modified new image data for preview image is displayed again (Step S503).

On the other hand, when the CPU 2 judges that the setting of the print conditions or the post-print processing conditions is not accepted (Step S504: NO), it judges whether or not the confirmation permitting or not permitting output of the created document data is requested with the same procedure as Embodiment 1 (Step S506).

When the CPU 2 judges that the confirmation permitting or not permitting output of the document data is not requested (Step S506: NO), the document data and the print conditions and the post-print processing conditions of the document data are sent to the printer driver 13, and they are converted into the PCL form by the printer driver 13 and are transmitted to the multi-function peripheral 400 via the communication unit 7 (Step S515).

On the other hand, when the CPU 2 judges that the confirmation permitting or not permitting output of the document data is requested (Step S506: YES), the judgment setting accepting section 130 accepts the settings of the judgment condition and the considering person via the judgment condition setting screen (Step S507).

As described above, in the present embodiment, since the condition that 'a printing is possible only if O.K. from the specific considering person is received' is set as the judgment condition, the specification accepting section 123 accepts the setting of the specific considering person with the procedure as described in Embodiment 1 (Step S508).

The image data transmitting section 122 transmits image data (EMF data) concerning the preview image displayed on the display 6 at Step S503 or displayed on the display 6 at Step S503 after Step S505, to the specific considering person and the considering person concerning the setting accepted by the judgment setting accepting section 130 at Step S507 (Step S509), and requests the confirmation permitting or not permitting output. Said image data is stored in the storage unit 8.

Then, the considering persons perform the confirmation permitting or not permitting output, and transmits to the PC 1 the output permission instruction and the comment which are the result of the confirmation permitting or not permitting output. At this time, the result accepting section 126 receives an output permission instructions (results of confirmation permitting or not permitting output) from the considering persons via the communication unit 7 (Step S510).

After a predetermined time has lapsed, the creating person confirms a reception of the output permission instructions on the document data using the preview application 12. At this time, the condition judgment section 124 judges whether or not the judgment condition accepted by the judgment setting accepting section 130 is satisfied, and the output judgment section 125 judges whether or not the document data is printed (outputted) based on a result of the judgment of the condition judgment section 124. Since, in the present embodiment, the condition that 'a printing is possible only if O.K. from the specific considering person is received' is set as the judgment condition, the condition judgment section 124 judges whether or not there is an output permission instruction from the specific considering person concerning the setting accepted at Step S508, in the received output permission instructions of permitting output (Step S511).

When there is an output permission instruction from the specific considering person in the received output permission instructions of permitting output, that is, when the condition judgment section 124 judges that the judgment condition is satisfied (Step S511: YES), the output judgment section 125 judges that the document data is "able to be outputted" (Step S514).

Then, for example, when the output of the document data is confirmed by the creating person, the preview application 12 reads out the image data stored in the storage unit 8 after being transmitted to the specific considering person and the considering person at Step S509 and sends it to the printer driver 13, and the image data is converted into the PCL form by the printer driver 13 and is transmitted to the multi-function peripheral 400 via the communication unit 7 (Step S515).

On the other hand, when there is no output permission instruction from the specific considering person in the received output permission instructions of permitting output, that is, when because the output permission instruction of not permitting output from the specific considering person is received, the condition judgment section 124 judges that the judgment condition is not satisfied (Step S511: NO), the output judgment section 125 judges that the document data is "not able to be outputted" (Step S512). In this case, the CPU 2 nullifies the print instruction accepted at Step S502 (Step S513), and completes the processing.

The same parts as in Embodiment 1 are designated with the same reference numbers, and detailed explanations thereof will be omitted.

Embodiment 5

FIG. 16 is a functional block diagram showing essential configurations of the PC 1 of Embodiment 5 of the present invention. The PC 1 of Embodiment 5 is configured so that a computer program for operating is capable of being provided by a removable recording mediums A, such as a CD-ROM, through an I/F 71. Moreover, the PC 1 of Embodiment 5 is configured so that the computer program is capable of being downloaded from an external device (not shown) through a communication unit 7. The contents will be explained below.

The PC 1 of Embodiment 5 comprises an external (or internal) recording medium reader (not shown). A removable recording medium A, which stores a program for generating image data for preview image corresponding to output data based on the output data, transmitting the image data for preview image to an external device, acquiring an output permission instruction representing permitting or not permitting output of output data concerning the transmitted image data, and judging whether or not the output data is outputted based on the acquired output permission instruction, or, a program for acquiring image data for preview image, displaying a preview image based on the acquired image data, accepting an output permission instruction representing permitting or not permitting output of output data concerning the displayed preview image, and transmitting the accepted output permission instruction to an acquisition source of the image data, or the like, is inserted into the recording medium reader device, and, for example, a CPU 2 installs the program in a ROM 3. The program is loaded in a RAM 4 and executed. Consequently, it functions as the PC 1 or the PC 100 of Embodiment 1 of the present invention.

The recording medium may be so-called program medium, or a medium carrying program codes in a fixed manner, such as tapes including a magnetic tape and a cassette tape, disks including magnetic disks such as a flexible disk and a hard disk, and optical disks such as a CD-ROM, MO, MD, and DVD, cards such as an IC card (including a memory card) and an optical card, or semiconductor memory such as a mask ROM, an EPROM, and an EEPROM, and a flash ROM.

Or the recording medium may be a medium carrying program codes in a flowing manner like downloading the program codes from a network through the communication unit 7. In the case where the program is downloaded from a communication network in such a manner, a program for downloading is stored in the main apparatus in advance, or installed from a different recording medium. Note that the present invention is also implemented in the form of a computer data signal embedded in a carrier wave in which the program codes are embodied by an electronic transfer.

The same parts as in Embodiment 1 are designated with the same reference numbers, and detailed explanations thereof will be omitted.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An output system comprising a creating apparatus for creating output data, and a display apparatus which is connected to the creating apparatus and displays a preview image corresponding to the created output data, wherein said creating apparatus comprises:
a generating section for generating image data for preview image based on the created output data; and
a transmitting section for transmitting the image data to the display apparatus;
a counting section for counting a number of received output permission instructions and a number of received output permission instructions of permitting output in all the received output permission instructions; and
judgment section for judging whether or not the number of the received output permission instructions of permitting output is over than or equal to half of all the received output permission instructions, and said display apparatus comprises:
a plurality of display apparatuses;
an image display section for displaying a preview image based on the received image data;
an instruction accepting section for accepting the output permission instructions representing permitting or not permitting output of output data concerning the displayed preview image; and
an instruction transmitting section for transmitting the output permission instructions accepted by the instruction accepting section to said creating apparatus, and said creating apparatus outputs said output data when the judgment section judges that the number of the received output permission instructions of permitting output is over than or equal to half of all the received output permission instructions.

2. The output system according to claim 1, wherein said creating apparatus further comprises:
   a setting accepting section for accepting settings of an output condition and a post-output processing condition of the output data; and
   a modifying section for modifying the image data for preview image based on the output condition and the post-output processing condition accepted by the setting accepting section, and wherein
   said transmitting section transmits the modified image data to said display apparatus, and in said display apparatus, said image display section displays a preview image based on the received and modified image data.

3. The output system according to claim 1, wherein said display apparatus further comprises an accepting section for accepting text data, and wherein
   the instruction transmitting section transmits the accepted text data to said creating apparatus, and
   said creating apparatus further comprises a display section for displaying text based on the received text data.

4. A creating apparatus for creating output data and generating image data for preview image corresponding to the output data based on the created output data, comprising:
   a transmitting section for transmitting the image data to an external apparatus;
   an instruction acquiring section for acquiring plurality of output permission instructions representing permitting or not permitting output of output data concerning the transmitted image data; and
   an output judgment section for judging whether or not the output data is outputted based on the acquired output permission instruction;
   a counting section for counting the number of the acquired output permission instructions. and the number of the acquired output permission instructions of permitting output in all the acquired output permission instructions; and
   a judgment section for judging whether or not the number of the acquired output permission instructions of permitting output is over than or equal to half of all the acquired output permission instructions, and wherein
   when the judgment section judges that the number of the acquired output permission instructions of permitting output is over than or equal to half of all the acquired output permission instructions the output judgment section judges to output the output data.

5. The creating apparatus according to claim 4, further comprising:
   a setting accepting section for accepting settings of an output condition and a post-output processing condition of the output data; and
   a modifying section for modifying the image data for preview image based on the output condition and the post-output processing condition accepted by the setting accepting section, wherein
   said transmitting section transmits the modified image data to the external apparatus.

6. The creating apparatus according to claim 4, wherein the instruction acquiring section acquires text data with the output permission instruction, and
   the creating apparatus further comprises a display section for displaying text based on the acquired text data.

7. The creating apparatus according to claim 4, further comprising an adding section for adding watermark data to the output data when the output judgment section judges that the output data is not outputted while the output data is outputted.

8. The creating apparatus according to claim 4, further comprising:
   a condition display section for displaying a plurality of judgment conditions whether or not the output data is outputted on the display section; and
   a condition selection accepting section for accepting selection of any judgment condition from the plurality of judgment conditions, and wherein
   the output judgment section judges whether or not the output data is outputted based on the judgment condition concerning the selection and the acquired output permission instruction.

9. An output method for creating and outputting output data using a creating apparatus which creates output data and generates image data for preview images corresponding to the output data based on the created output data, the method comprising:
   a step for generating image data for preview image corresponding to output data based on the created output data;
   a step for transmitting the generated, image data for preview image to an external apparatus;
   a step for acquiring a plurality of output permission instructions representing permitting or not permitting output of output data concerning the transmitted image data;
   a step for counting the number of acquired output permission instructions, and the number of the acquired output permission instructions of permitting output in all the acquired output permission instructions;
   a step for judging whether or not the output data is outputted based on the number of the acquired output permission instructions of permitting output is over than or equal to half of all the acquired output permission instructions; and
   a step for outputting the output data when the number of the acquired output permission instructions of permitting output is over than or equal to half of all the acquired output permission instructions.

10. A non-transitory computer-readable recording medium in which a computer program for creating and outputting output data is recorded, said computer program comprising:
    a step for causing the computer to generate image data for preview image corresponding to output data based on the created output data;
    a step for causing the computer to transmit the generated image data for preview image to an external apparatus;
    a step for causing the computer to acquire a plurality of output permission instructions representing permitting or not permitting output of output data concerning the transmitted image data;
    a step for causing the computer to count the number of acquired output permission instructions, and the number of the acquired output permission instructions of permitting output in all the acquired output permission instructions
    a step for causing the computer to judge whether or not the output data is outputted based on the number of the acquired output permission instructions of permitting output is over than or equal to half of all the acquired output permission instructions; and
    a step for causing the computer to output the output data when the computer judges that the number of the acquired output permission instructions of permitting output is over than or equal to half of all the acquired output permission instructions.

* * * * *